(12) United States Patent
Feria et al.

(10) Patent No.: US 7,046,856 B2
(45) Date of Patent: May 16, 2006

(54) ACCELERATED PREDICTIVE-TRANSFORM

(76) Inventors: Erlan H. Feria, 499 Sayre Ave., Princeton, NJ (US) 08540; Sos Agaian, 732 University Row Apt. 204, San Antonio, TX (US) 78249

( * ) Notice: Subject to any disclaimer, the term of this patent is extended or adjusted under 35 U.S.C. 154(b) by 707 days.

(21) Appl. No.: 10/290,096

(22) Filed: Nov. 7, 2002

(65) Prior Publication Data

US 2003/0113024 A1   Jun. 19, 2003

Related U.S. Application Data

(60) Provisional application No. 60/337,787, filed on Nov. 7, 2001.

(51) Int. Cl.
 *G06K 9/36* (2006.01)
(52) U.S. Cl. .................... 382/248; 382/238
(58) Field of Classification Search ........... 382/238, 382/248, 253
 See application file for complete search history.

(56) References Cited

U.S. PATENT DOCUMENTS

| | | | |
|---|---|---|---|
| 5,295,203 A * | 3/1994 | Krause et al. .............. | 382/248 |
| 5,966,470 A * | 10/1999 | Miyashita et al. .......... | 382/248 |
| 6,760,479 B1 * | 7/2004 | Feria ......................... | 382/238 |
| 6,839,467 B1 * | 1/2005 | Bruna et al. ................ | 382/239 |

OTHER PUBLICATIONS

Specification of U.S. Appl. No. 08/696,107, entitled "Super Predictive-Transform Coding," filed Oct. 23, 2000.

Erlan H. Feria, "Predictive Transform Estimation," *IEEE Transactions on Signal Processing*, vol. 39, No. 11, Nov. 1991.

Erlan H. Feria, "Decomposed Predictive Transform Estimation," *IEEE Transactions on Signal Processing*, vol. 42, No. 10, Oct. 1994.

Joseph R. Guerci and Erlan H. Feria, "On a Least Squares Predictive-Transform Modeling Methodology," *IEEE Transactions on Signal Processing*, vol. 44, No. 7, Jul. 1996.

Joseph R. Guerci and Erlan H. Feria, "Application of a Least Squares Predictive-Transform Modeling Methodology to Space-Time Adaptive Array Processing," *IEEE Transactions on Signal Processing*, vol. 44, No. 7, Jul. 1996.

Erlan H. Feria, "Predictive Transform, Part I: Signal Coding and Modeling," *Eleventh triennial World Congress of IFAC*, Tallinn (Estonia Russia) pp. 77-82, 1990.

(Continued)

*Primary Examiner*—Duy M. Dang
(74) *Attorney, Agent, or Firm*—Darby & Darby

(57) ABSTRACT

The present invention is drawn to a method for digital image modeling in which the digital image is divided into digital image blocks. First, a coder input vector of the digital image blocks is received. Second, a coefficient vector is approximated, each coefficient or coefficient vector corresponding to one of the digital image blocks. The approximating step further comprises generating a transformation matrix that yields a coefficient vector from a product of the coder input vector and decomposing the transformation matrix into a product of multi-diagonal or sparse unitary transformation matrixes and an energy sequencer unitary transformation matrix.

14 Claims, 5 Drawing Sheets

APT Forward Transformation $$\tilde{c}(k+1) = \tilde{R}^t x(k+1) \quad \text{where} \quad \tilde{R} = H_0 H_1 \cdots H_{L-1} E$$

$n \sum_{i=0}^{L-1} w_i$ multiplications and $n \sum_{i=0}^{L-1} (w_i - 1)$ additions

OTHER PUBLICATIONS

Erlan H. Feria, "Predictive, Transform Coding," *IEEE 1986 National Aerospace and Electronics Conference NAECON*, vol. 1, pp. 45-52, 1986.

Steven C. Chapra and Raymond P. Canale, Numerical Methods for Engineers: With Software and ; Programming Applications Fourth Edition, pp. 767-771, 2002.

* cited by examiner

PRIOR ART
Fig. 3A  *MMSE* PT Forward Transformation
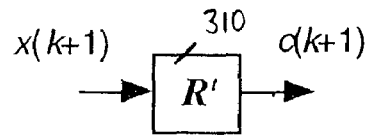
$$c(k+1) = R^t x(k+1)$$
$n^2$ multiplications and $n(n-1)$ additions
Fig. 3B  *APT* Forward Transformation
$$\tilde{c}(k+1) = \tilde{R}^t x(k+1) \quad \text{where} \quad \tilde{R} = H_0 H_1 \cdots H_{L-1} E$$
$n \sum_{i=0}^{L-1} w_i$ multiplications and $n \sum_{i=0}^{L-1} (w_i - 1)$ additions PRIOR ART
Fig. 4A     MMSE PT Backward Transformation
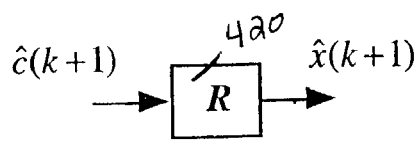
$$\hat{x}(k+1) = R\hat{c}(k+1)$$
$n^2$  multiplications   and   $n(n-1)$  additions
Fig. 4B     APT Backward Transformation
$$\tilde{x}(k+1) = \tilde{R}\hat{c}(k+1) \quad \text{where} \quad \tilde{R} = H_0 H_1 \cdots H_{L-1} E$$
$n \sum_{i=0}^{L-1} w_i$  multiplications   and   $n \sum_{i=0}^{L-1} (w_i - 1)$  additions

PRIOR ART

Fig. 5A

MMSE PT Forward Prediction

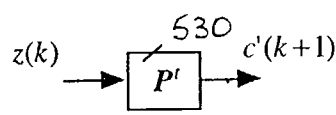

$$c'(k+1) = P^t z(k)$$

$nm$ real multiplications and $n(m-1)$ real additions

Fig. 5B

APT Forward Prediction

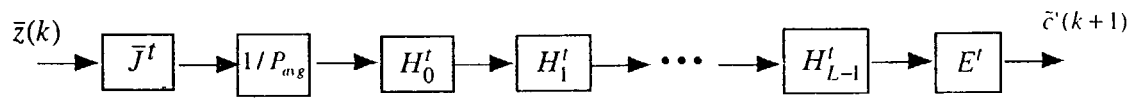

$$\tilde{c}'(k+1) = \tilde{P}^t \bar{z}(k) \quad \text{where} \quad \tilde{P} = J\tilde{R}/P_{avg}$$

$$\tilde{R} = H_0 H_1 \cdots H_{L-1} E$$

$nm$ integer multiplications and $n(m-1)$ integer additions for integer product $\bar{J}^t \bar{z}(k)$ $n$ divisions, real or integer depending on value of $P_{avg}$, for ratio $[\bar{J}^t \bar{z}(k)]/P_{avg}$ $n \sum_{i=0}^{L-1} w_i$ real multiplications and $n \sum_{i=0}^{L-1} (w_i - 1)$ real additions for real product $E^t H_{L-1}^t \cdots H_1^t H_0^t [\bar{J}^t \bar{z}(k)/P_{avg}]$

ACCELERATED PREDICTIVE-TRANSFORM

CROSS-REFERENCE TO RELATED APPLICATIONS

This application claims the benefit of priority from provisional U.S. Patent Application Ser. No. 60/337,787 entitled "Accelerated Predictive-Transform" filed Nov. 7, 2001, the disclosure of which is incorporated by reference in its entirety.

FIELD OF THE INVENTION

The present invention relates to the acceleration or in other words the fast computation of signal and image models and, more particularly, to an improved accelerated predictive-transform ("PT") modeling method and apparatus for use in signal and image compression, estimation, detection, identification, channel source integrated ("CSI") coding, control and other related application areas.

BACKGROUND OF THE INVENTION

Accelerated signal and image modeling methods and devices are well known. Some known traditional acceleration methods are based on transformation signal and image modeling schemes that approximate optimum transformation schemes commonly referred to as the Karhunen-Loeve transform ("KLT"). For example, the discrete cosine transform ("DCT") is such an acceleration scheme that has found widespread application in diverse areas such as image compression where it is the basis of international standards such as JPEG and MPEG. These standards decompose the images into low dimensional, 8×8, picture element ("pixel") blocks for their fast transformation and subsequent compression. However, these acceleration schemes are limited to transformation models, and generally do not work as well when applied in more general modeling frameworks that combine both prediction and transformation.

For example, in image compression applications, a methodology integrating prediction and transformation models and using an optimum minimum mean squared error ("MMSE") criterion has been found to significantly improve the blocking effects that result from transformation methods such as the DCT that do not use prediction to exploit the correlation that exists between encoded pixel blocks. An image compression method based on this MMSE PT modeling methodology was filed on Oct. 22, 2000 as U.S. patent application Ser. No. 09/696,197 entitled "Super Predictive-Transform Coding" (the '197 application), the disclosure of which is herein incorporated by reference in its entirety. The '197 application has been found to significantly outperform the best image compression techniques available at the present time, including both DCT and wavelet based compressors. The key to the high performance of the aforementioned invention is a MMSE PT signal and image model superstructure that forms the basis of the proposed method and apparatus. The MMSE PT model consists of prediction and transformation matrices that result from the solution of coupled eigensystem and normal design equations.

In addition to image compression, the modeling technique can also be incorporated in other signal and image processing applications such as estimation, detection, identification, channel and source integrated ("CSI") coding, control and other related areas. See for instance Feria, E. H., "Predictive-Transform Estimation", IEEE Transactions on Signal Processing, November 1991 (the "1991 IEEE Trans. On Signal Processing paper") and also Feria, E. H. "Decomposed Predictive-Transform Estimation", IEEE Transactions on Signal Processing, October 1994, the disclosure of both which is herein incorporated by reference in their entirety, where it was shown that a MMSE PT signal model can be used to generate a new class of estimators that has as special cases classical Kalman and Wiener estimators and that in addition leads to very simple decomposed structures. In two other publications Guerci, J. R. and Feria, E. H. "On a Least Squares Predictive-Transform Modeling Methodology," IEEE Transactions on Signal Processing, July 1996, and Guerci, J. R. and Feria, E. H. "Application of a Least Squares Predictive-Transform Modeling Methodology to Space-Time Adaptive Array Processing," IEEE Transactions on Signal Processing, July 1996, the disclosure of both is herein incorporated by reference in their entirety, demonstrate how the MMSE PT signal model forms the basis of a more general adaptive signal modeling strategy that has widespread applications. In Feria, E. H. "Predictive Transform: Signal Coding and Modeling," Eleventh Triennial World Congress of IFAC, Tallinn (Estonia, USSR), Oxford: Pergamon Press, August 1990, the disclosure of which is herein incorporated by reference in its entirety, the technique was applied to the modeling of control processes or plants.

One problem with traditional methods of prediction and transformation is that the tend to be slow. Additionally, the computational burden of traditional methods was excessive.

These and other deficiencies in the methods for traditional accelerated signal and image modeling are addressed by the present invention.

SUMMARY OF THE INVENTION

A first embodiment of the present invention is directed to a method of digital image modeling involving a digital image that has been divided into a plurality of digital image blocks. First, a coder input vector of a plurality of digital image blocks is received. Second, a coefficient vector is approximated in which each coefficient of the coefficient vector corresponds to one of the digital image blocks. The approximating step further comprises the steps of (1) generating a forward transformation matrix that yields a coefficient vector from a product of the coder input vector and (2) decomposing the forward transformation matrix into a product of at least one of a multi-diagonal transformation matrix and a sparse unitary transformation matrix and an energy sequencer unitary transformation matrix.

A second embodiment of the present invention is directed to a method of digital image modeling involving a digital image that has been divided into a plurality of digital image blocks. First, a coefficient vector is received in which each coefficient or coefficient vector corresponds to one of a plurality of digital image blocks. Second, a coder input vector of the digital image blocks is approximated. The approximating step further comprises the steps of (1) generating a backward transformation matrix that yields a coder input vector from a product of the coefficient vector and (2) decomposing the backward transformation matrix into a product of at least one of a multi-diagonal transformation matrix and a sparse unitary transformation matrix and an energy sequencer unitary transformation matrix.

The third embodiment of the present invention is directed to a method of digital image modeling involving a digital image that has been divided into a plurality of digital image blocks. First, a predictive vector is received representing a plurality of digital image blocks immediately adjacent a coder input vector comprising a plurality of digital image blocks of a divided digital image. Second, a coefficient vector is approximated in which each coefficient of the coefficient vector corresponds to one of the digital image blocks of the divided digital image. The approximating step further comprises the steps of (1) generating a forward prediction matrix that yields a coefficient vector from a product of the coder input vector and (2) decomposing the forward prediction matrix into a product of at least one of a multi-diagonal and a sparse unitary transformation matrix and an energy sequencer unitary transformation matrix and a cross variance matrix divided by the coder input vector's average power Other objects and features of the present invention will become apparent from the following detailed description considered in conjunction with the accompanying drawings. It is to be understood, however, that the drawings are designed solely for the purpose of illustration and not as a definition of the invention.

BRIEF DESCRIPTION OF THE DRAWINGS

The foregoing and other features of the present invention will be more readily apparent from the following detailed description and drawings of illustrative embodiments of the invention wherein like reference numbers refer to similar elements throughout the several views and in which:

FIG. 3a is a schematic block diagram of a traditional MMSE PT forward transformation technique;

FIG. 3b is a schematic block diagram of a forward transformation scheme in accordance with an embodiment of the present invention;

FIG. 4a is a schematic block diagram of a traditional MMSE PT backward transformation technique;

FIG. 4b is a schematic block diagram of a backward transformation scheme in accordance with an embodiment of the present invention;

FIG. 5a is a schematic block diagram of a traditional MMSE PT forward prediction technique; and, FIG. 5b is a schematic block diagram of a forward prediction scheme in accordance with an embodiment of the present invention.

DETAILED DESCRIPTION OF PREFERRED EMBODIMENTS

By way of overview and introduction, the present invention is the acceleration of both the design, on-line and/or off-line, and implementation, on-line, of optimum, i.e., MMSE, prediction and transformation matrices. These matrices are found to inherently arise from the solution of coupled eigensystem and normal, or generalized Wiener-Hopf, equations and lead to a MMSE PT signal or image model. The present application has application in diverse fields, including but not limited to signal and image compression, estimation, detection, identification, CSI coding and control.

The present invention successfully overcomes the excessive computational burden associated with the evaluation of prediction and transformation matrices from generally high-dimensional coupled eigensystem and normal equations. This is achieved by the decomposition of the original high-dimensional design equations into a set of easily solved low-dimensional design equations. When the decomposed design equations are of very low dimension, say 2×2, analytical solutions are forthcoming resulting in even greater accelerations.

The decomposition of a PT unitary transformation matrix into a product of multi-diagonal and/or sparse unitary matrices in accordance with the present invention leads to an accelerated evaluation of the product of each PT unitary transformation matrix by an arbitrary vector. The representation of a PT prediction matrix by the product of an integer cross covariance matrix and a PT unitary transformation matrix in decomposed form, also leads to an accelerated evaluation of the product of each component of the PT prediction matrix by an arbitrary vector.

Hereinafter our method will be referred as accelerated predictive-transform ("APT"), with the understanding that the acceleration refers to both the acceleration of the design of the APT transformation and prediction matrices and the acceleration of the product of the APT transformation and prediction matrices by arbitrary and properly dimensioned vectors.

A signal and/or image compression application will be used to first document the origins of the MMSE PT signal model from a unifying MMSE PT source coding scheme initially formulated in Feria, E. H., "Predictive-Transform Coding,", Proceedings of 1986 IEEE NAECON, Dayton, Ohio, May 1986, (the "1986 IEEE NAECON paper") and then to show how the APT scheme of the current invention arises naturally from the MMSE PT signal model.

Figure 1:
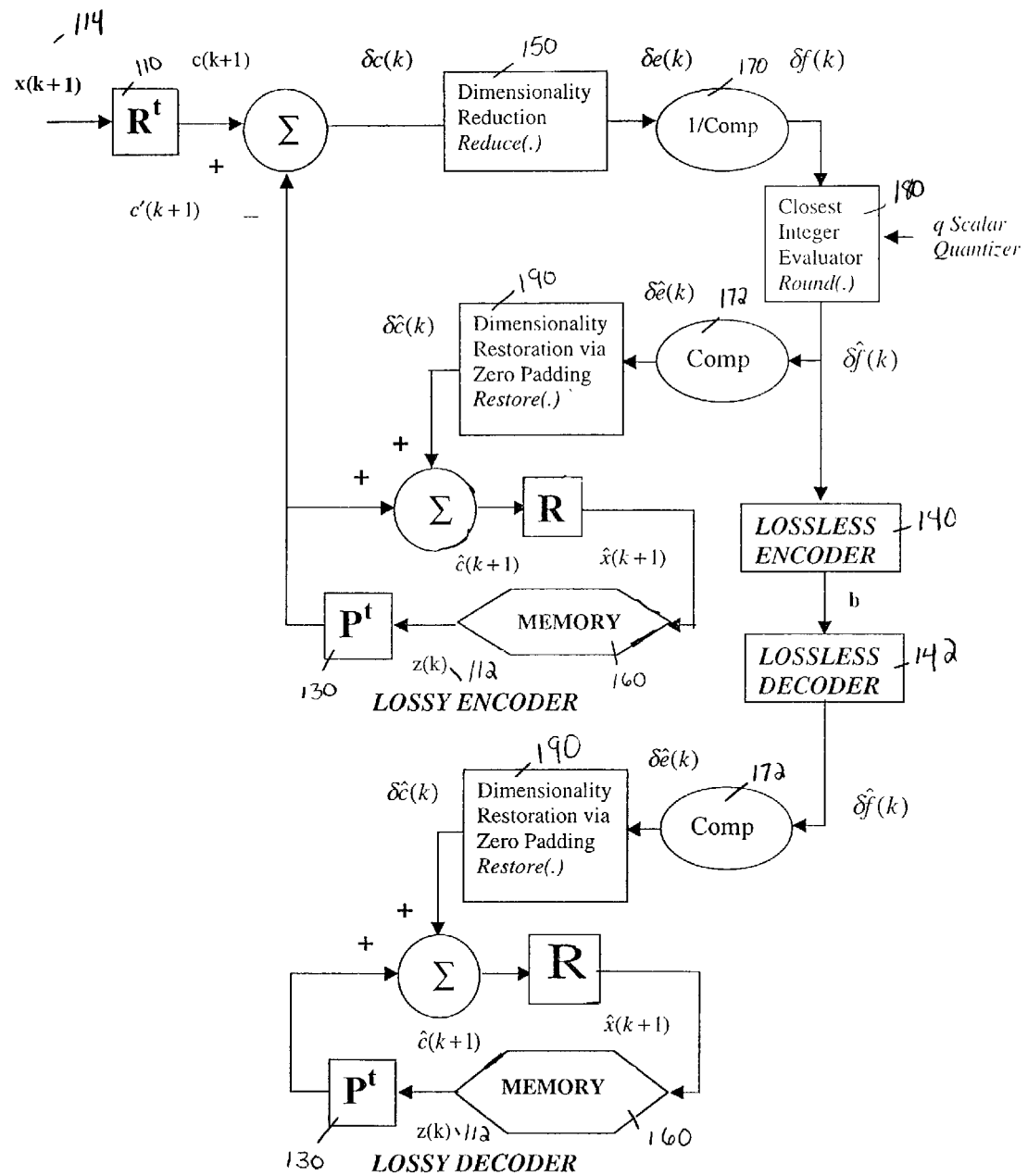
FIG. 1 is a schematic block diagram illustrating a traditional MMSE PT source encoder/decoder scheme leading to a MMSE PT signal model.
Figure 2:
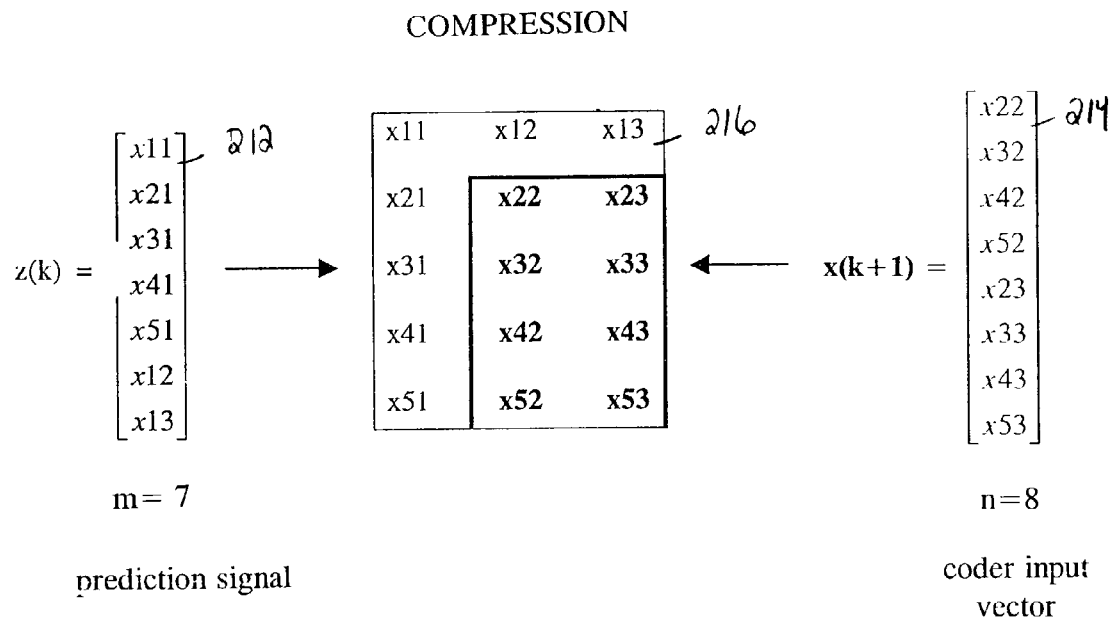
FIG. 2 is a schematic illustration of an exemplary geometry for block transformation and prediction in accordance with an embodiment of the present invention.

The APT scheme in accordance with the present invention will be explained using FIGS. 1 thru 5b. A MMSE PT coder structure leading to the development of a MMSE PT signal model is shown in FIG. 1. A schematic illustration for the geometry of the input 214 and prediction signals 212 is depicted in FIG. 2. An APT forward transformation is introduced in FIG. 3, and in FIG. 4 the corresponding APT backward transformation is also considered. Finally, in FIG. 5 an APT prediction is depicted.

The lossy encoder and decoder sections of FIG. 1 may be characterized by the following twelve signals:

The coder input vector x(k+1) 114 of dimension n×1.

The coefficient vector c(k+1) of dimension n×1.

The coder input and coefficient vector estimates $\hat{x}(k+1)$ and $\hat{c}(k+1)$, each of dimension n×1.

The prediction vector z(k) of dimension m×1.

The predicted coefficient vector c'(k+1) of dimension n×1.

The coefficient error or innovation vector δc(k) of dimension n×1. More specifically, $\delta c(k)=[\delta c_1(k) \delta c_2(k) \ldots \delta c_n(k)]^t$ with the variance of each scalar element $\delta c_j(k)$ increasing as the value of j increases from 1 to n. Also the coefficient error δc(k) is zero mean with uncorrelated elements. A justification of these properties, for instance, the formulation of MMSE PT coding may be found in the 1986 IEEE NAECON paper, the disclosure of which is incorporated herein by reference in its entirety.

The truncated coefficient error vector δe(k) of dimension q×1 where q≦n. The q elements of δe(k) are the q most energetic elements of δc(k), i.e., $\delta e(k)=[\delta c_{n-q+1}(k) \delta c_{n-q+2}(k) \ldots \delta c_n(k)]^t$.

The scaled and truncated coefficient error vector δf(k) of dimension q×1.

The scaled and truncated coefficient error integer vector $\delta\hat{e}(k)$ of dimension q×1.

The truncated coefficient error vector estimate $\delta\hat{e}(k)$ of dimension q×1.

The coefficient error vector estimate $\delta\hat{c}(k)$ of dimension n×1.

The bit stream b of dimension 1×B where B denotes the number of bits present in b.

The following nine subsystems may also characterize the lossy encoder and decoder:

A transposed transformation matrix $R^t$ 110 of dimension n×n—where the matrix R is unitary and hence its transpose is the same as its inverse—which multiplies the coder input vector x(k+1) 114 to yield the coefficient vector c(k+1). When the transformation is used in this way it is said that a forward transformation from the spatial domain of x(k+1) to the coefficient domain of c(k+1) has occurred.

A unitary transformation matrix R 420 that multiplies the coefficient vector estimate $\hat{c}(k+1)$ to yield the coder input vector estimate $\hat{x}(k+1)$. When the transformation is used in this way it is said that a backward transformation from the coefficient domain of $\hat{c}(k+1)$ to the spatial domain of $\hat{x}(k+1)$ has occurred.

A transposed prediction matrix $P^t$ 530 of dimension n×m that is multiplied by the prediction vector z(k) to yield the predicted coefficient vector c'(k+1). In this case it is said that a forward prediction has occurred from the spatial domain of z(k) to the coefficient domain of c'(k+1).

A dimensionality reduction subsystem 150 that multiplies the n−q less energetic elements of the n-dimensional coefficient error vector δc(k) by zero gains. This multiplication, in turn, results in the q-dimensional truncated coefficient error vector δe(k).

A memory device 160 that temporarily stores recently reconstructed coder input vector estimates $\{\hat{x}(0) \ldots \hat{x}(k)\}$. These stored vectors are used at each processing stage to construct the prediction vector z(k).

A scaling device with gain 1/Comp 170 responsible for establishing the amount of compression associated with the coder. More specifically, the constant Comp is adjusted to produce the desired amount of compression for the coder.

q scalar quantizers 180 implemented by finding the closest integer vector, δf(k), to the scaled and truncated coefficient error δf(k), i.e., δf(k)=Round(δf(k)).

A scaling device with gain Comp 172 responsible for generating the truncated coefficient error vector estimate δê(k) from the scaled and truncated coefficient error integer vector δf(k).

A dimensionality restoration subsystem 190 that restores the coefficient error estimate δĉ(k) from the truncated coefficient error estimate δê(k) via zero padding.

The lossless PT encoder 140 and decoder 142 of FIG. 1 do not make use of the APT invention and therefore a detailed explanation of its operation is not provided here. A detailed account may be found, however, in U.S. patent application Ser. No. 09/696,197, filed Oct. 23, 2000, entitled "Super Predictive-Transform Coding."

The PT source coder structure of FIG. 1 was offered for the first time in the 1986 IEEE NAECON paper. In this paper it was revealed that the minimization of the mean squared error (MSE)

$$E[x(k+1)-\hat{x}(k+1))^t(x(k+1)-\hat{x}(k+1))] \quad (1)$$

with respect to the prediction and transformation matrix R and P and subject to zero mean and uncorrelated coefficient innovations, leads to optimum prediction and transformation matrices, R and P, that are designed off-line (or on-line in adaptive applications) by solving the following coupled eigensystem and normal equations:

$$KR=R\Lambda \quad (2)$$

$$P=JR \quad (3)$$

$$K = Exx^t - \begin{bmatrix} Exz^t & Ex \end{bmatrix} Inv\begin{bmatrix} Ezz^t & Ez \\ Ez^t & 0 \end{bmatrix}\begin{bmatrix} Ezx^t \\ Ex^t \end{bmatrix} \quad (4)$$

$$J = \begin{bmatrix} I_m & 0_{m\times 1} \end{bmatrix} Inv\begin{bmatrix} Ezz^t & Ez \\ Ez^t & 0 \end{bmatrix}\begin{bmatrix} Ezx^t \\ Ex^t \end{bmatrix} \quad (5)$$

where: a) K is a n×n positive definite error or innovation covariance matrix; b) J is a m×n cross covariance matrix; c) Λ is a n×n diagonal eigenvalue matrix; d) $I_m$ is a m×m identity matrix; e) $0_{m\times 1}$ is a zero column vector; f) Ex and Ez are first order expectations of the coder input vector 114 and prediction signals 112 x(k+1) and z(k); g) $Exx^t$, $Exz^t$, $Ezx^t$ and $Ezz^t$ are second order expectations of x(k+1) and z(k); and h) "Inv(•)" denotes a matrix inversion.

The need for the off-line (or on-line for the adaptive case) evaluation of the optimum prediction and transformation matrices, P and R, from the MMSE PT design equations (2)–(3) can result in a significant computational burden. This problem is well documented in pp. 767–771 of the recent text "Numerical Methods for Engineer", by Steven C. Chapra and Raymond P. Canale, Fourth Edition, 2002, herein incorporated by reference in its entirety. For example, the "Power Method" described in that text begins the evaluation of each eigenvector/eigenvalue of R with the assumption that the initial value for the considered eigenvector—the one with highest eigenvalue—is a vector whose elements are all one, and then obtains during each algorithmic iteration an improved result until the desired eigenvector is obtained. A new eigenvector is then obtained using as a foundation the previously obtained eigenvector. Clearly this approach is computationally inefficient, particularly for the case where the dimensionality of the eigensystem is large. The APT invention to be discussed shortly addresses this fundamental problem.

When the PT source coder is fully lossless, i.e., when q=n, Comp=1, and the q scalar quantizers are all replaced with unity gains, it follows that $$\delta\hat{c}(k)=\delta c(k) \quad (6)$$

and the lossy decoder of FIG. 1 becomes a lossless decoder. It is shown in the 1991 IEEE Trans. on Signal Processing paper that this lossless decoder can then be viewed as a MMSE PT model for the source whose output is being encoded. The describing equations for this lossless decoder, or equivalently the MMSE PT model for the signal source, are as follows:

$$x(k+1)=Rc(k+1) \quad (7)$$

$$c(k+1)=P^t z(k)+\delta c(k) \quad (8)$$

where all the variables of the signal model (7) and (8) were defined earlier for FIG. 1.

An investigation of FIG. 1 as well as the MMSE PT model of (7) and (8) reveals that there are three types of multiplications that must be executed on-line. These are the MMSE PT forward transformation product $R^t x(k+1)$ executed by the input section of the PT lossy encoder of FIG. 1, the MMSE PT backward transformation product $R\hat{c}(k+1)$ and the MMSE PT forward prediction product $P^t z(k)$ executed by the feedback section to the PT lossy encoder and also the PT lossy decoder of FIG. 1. Any one of these three products will require $$n^2 \text{ multiplications and } n(n-1) \text{ additions} \qquad (9)$$

under the simplifying assumption that m=n when considering the MMSE PT forward prediction product. Similarly as with the solution of the coupled eigensystem and normal design equations of (2) and (3) it is noticed that the computational burden associated with the above three products (9) is quite inefficient when the dimension of the input signal n is large. The APT invention to be discussed shortly addresses this fundamental problem.

FIG. 2 schematically illustrates the geometry of the coder input vector 214 and prediction signals x(k+1) and z(k) for a simplified 2D image compression example, wherein $x_{i,j}$, for all (i,j) pairs, denotes the i-th row and j-th column pixel of the image. In this figure it is noted that the input signal x(k+1) is made up of all the pixels present in a 4×2 pixel block, with the dimension of x(k+1) being eight, i.e., n=8. It is also noted that the prediction vector z(k) is made up of all the seven pixels immediately adjacent to the left and top of the 4×2 pixel block, with the dimension of z(k) being seven, i.e., m=7. It is also assumed that the PT coder encodes the image from left to right and top to bottom encoding 4×2 pixel blocks at a time. The first and second order expectations required for the solution of the coupled design equations (2)–(5) are found using either natural images or the isotropic model described in the 1991 IEEE Trans. on Signal Processing paper and given here in more concise form by $$E[x_{i,j}]=C \text{ and } E[x_{i,j}x_{i+v,j+h}]=P_{avg}\rho^{\sqrt{v^2+h^2}} \text{ for all } i,j \qquad (10)$$

where: a) $E[x_{i,j}]$ denotes the mean value of the pixel $x_{i,j}$; b) C is a constant value; b) v and h denote the vertical and horizontal distances between pixels $x_{i,j}$ and $x_{i+v,j+h}$; c) $E[x_{i,j}x_{i+v,j+h}]$ denotes the correlation between the pixels $x_{i,j}$ and $x_{i+v,j+h}$; d) $P_{avg}$ denotes the average power for any pixel $x_{i,j}$; and e) $\rho$ denotes the correlation coefficient between any two adjacent pixels either in the vertical direction, i.e., the pixels $x_{i,j}$ and $x_{i+1,j}$ for all i and j, or horizontal direction, i.e., the pixels $x_{i,j}$ and $x_{i,j+1}$ for all i and j.

To facilitate the presentation of the APT invention we will assume that monochrome images are being compressed and each image pixel is represented with 8 bits, i.e., the image pixels can have integer values from 0 to 255. In addition, we will assume for the isotropic model of (10) the parameter values C=100, $P_{avg}$=11,200, and $\rho$=0.99, and for the coder input vector 214 and prediction signal 212 geometry the one shown in FIG. 2. The following expressions are then obtained for the corresponding n×n or in other words 8×8 innovation covariance matrix K and the corresponding m×n or in other words 7×8 cross covariance matrix J:

$$K = \begin{bmatrix} 12.77 & 6.18 & 3.19 & 1.93 & 6.35 & 6.60 & 4.68 & 3.26 \\ 6.18 & 16.49 & 8.44 & 4.81 & 6.86 & 11.82 & 10.52 & 7.62 \\ 3.19 & 8.44 & 18.06 & 9.94 & 5.05 & 10.70 & 14.75 & 13.07 \\ 1.93 & 4.81 & 9.94 & 20.66 & 3.80 & 8.20 & 13.74 & 18.53 \\ 6.35 & 6.86 & 5.05 & 3.80 & 17.79 & 12.92 & 9.42 & 7.17 \\ 6.60 & 11.82 & 10.70 & 8.20 & 12.92 & 27.41 & 20.00 & 15.07 \\ 4.68 & 10.52 & 14.75 & 13.74 & 9.42 & 20.00 & 32.94 & 25.05 \\ 3.26 & 7.62 & 13.07 & 18.53 & 7.17 & 15.07 & 25.05 & 38.62 \end{bmatrix} \qquad (11)$$

and $$J = \begin{bmatrix} -.0605 & -.1118 & -.0953 & -.0777 & -.1147 & -.1469 & -.1421 & -.1265 \\ .3121 & .1456 & .0137 & -.0115 & .0925 & .0765 & .0184 & -.0124 \\ .1676 & .3895 & .1859 & .0379 & .1117 & .1880 & .1420 & .0635 \\ .0372 & .1926 & .4058 & .1970 & .0614 & .1556 & .2189 & .1643 \\ .0156 & .0721 & .2793 & .6942 & .0650 & .1688 & .3535 & .5924 \\ .3137 & .1018 & .0378 & .0126 & .1491 & .0881 & .0408 & .0142 \\ .2142 & .2102 & .1729 & .1476 & .6350 & .4698 & .3686 & .3044 \end{bmatrix} \qquad (12)$$

Using expressions (11) and (12) in the design equation (2)–(3) the following MMSE PT 7×8 prediction, 8×8 transformation and 8×8 eigenvalue matrices are obtained:

$$P = \begin{bmatrix} -.0097 & .0145 & -.0037 & -.0044 & .0170 & .0060 & -.0727 & -.3102 \\ -.0297 & .0870 & -.0446 & -.1387 & -.1680 & -.0466 & .2386 & .1299 \\ .0520 & -.0499 & .0644 & -.1131 & -.0431 & -.2040 & .2662 & .3890 \\ -.0487 & -.0725 & -.0496 & .0711 & .0256 & -.2677 & .0039 & .5073 \\ .0341 & .0996 & .0508 & .1821 & -.2029 & -.0943 & -.4377 & .8863 \\ -.0415 & .0771 & -.0862 & -.0943 & -.1836 & -.0123 & .2305 & .1768 \\ .0490 & -.0968 & -.0913 & .1302 & -.1412 & .2204 & .4000 & .8536 \end{bmatrix} \qquad (13)$$

$$R = \begin{bmatrix} .2883 & -.4549 & -.3248 & .4426 & .5231 & -.0728 & -.3372 & .1261 \\ -.4584 & .2400 & .4475 & .3620 & .0880 & -.4657 & -.3447 & .2399 \\ .4358 & .3615 & -.3574 & -.2205 & -.1150 & -.6315 & .0104 & .3016 \\ -.2332 & -.4277 & .1757 & -.5161 & .4238 & -.2483 & .3580 & .3098 \\ -.2674 & .4054 & -.3033 & -.3864 & .3539 & .3899 & -.4415 & .2251 \\ .4271 & -.2313 & .4782 & -.2331 & -.2891 & .2132 & -.4313 & .4075 \\ -.4062 & -.2944 & -.4355 & .1592 & -.5154 & .0796 & .0520 & .5086 \\ .2085 & .3425 & .1593 & .3594 & .2267 & .3370 & .5056 & .5140 \end{bmatrix}$$ (14)

and $$\Lambda = \begin{bmatrix} 5.858 & 0 & 0 & 0 & 0 & 0 & 0 & 0 \\ 0 & 7.060 & 0 & 0 & 0 & 0 & 0 & 0 \\ 0 & 0 & 7.618 & 0 & 0 & 0 & 0 & 0 \\ 0 & 0 & 0 & 9.292 & 0 & 0 & 0 & 0 \\ 0 & 0 & 0 & 0 & 12.133 & 0 & 0 & 0 \\ 0 & 0 & 0 & 0 & 0 & 12.998 & 0 & 0 \\ 0 & 0 & 0 & 0 & 0 & 0 & 28.095 & 0 \\ 0 & 0 & 0 & 0 & 0 & 0 & 0 & 101.684 \end{bmatrix}$$ (15)

Note from (15) that the eigenvalues associated with the MMSE PT transformation matrix R are in ascending order. This property is consistent with the desire to have the variance of the elements of the efficient innovation $\delta c(k) = [\delta c_1(k) \delta c_2(k) \ldots \delta c_n(k)]^t$ the PT source coder of FIG. 1 increase as the value of the index j of $\delta c_j(k)$ increases from 1 to n.

In FIG. 3b the forward transformation apparatus of the present invention is shown and contrasted with that of the traditional MMSE PT forward transformation scheme shown in FIG. 3a. From FIGS. 3a and 3b it is noted that the traditional MMSE PT forward transformation apparatus of FIG. 1, consisting of a single transformation block R that performs $n^2$ multiplications and $n(n-1)$ additions when evaluating the expression $$c(k+1) = R^t x(k+1),$$ (16)

is replaced in the present invention with a cascade of L+1 computational blocks that as a $$n \sum_{i=0}^{L-1} w_i \text{ multiplications}$$ (17)

and $$n \sum_{i=0}^{L-1} (w_i - 1) \text{ additions}$$ (18)

when evaluating the expression $$\tilde{c}(k+1) = \tilde{R}^t x(k+1) \text{ with } \tilde{R} = H_0 H_1 \ldots H_{L-1} E$$ (19)

where: a) the dimension of the input signal x(k+1), n, is assumed to be some positive integer power of 2, i.e., $$n = 2^N \text{ with } N \in (1, 2, \ldots)$$ (20)

b) $\tilde{R}$ is a n×n unitary transformation matrix that approximates the MMSE PT transformation R; c) $\tilde{c}(k+1)$ is an approximation to the MMSE PT coefficient vector c(k+1); d) $H_f$ for all $f = 0, 1, \ldots, L-1$ is a n×n unitary transformation matrix characterized by a sparse structure, with exactly $w_f$ nonzero elements for each of its rows and columns, and a $w_f \times w_f$ eigensystem, that may be solved to find all of its nonzero elements; e) $w_f$ for all f is a positive integer power of 2 less than or equal to n, i.e., $$w_f = 2^{q_f} \text{ with } q_f \in (1, 2, \ldots)$$ (21)

and $$w_f \leq n;$$ (22)

f) the sparse structure of $H_f$ leads to a computational burden for the evaluation of expression (19) that is summarized by expressions (17) and (18); g) the number of $H_f$ computational blocks, L, satisfies the constraint $$\sum_{f=0}^{L-1} \log_2 w_f = \log_2 n,$$ (23)

e.g., when $w_f$ is given by the stage invariant expression $$w_f = 2^q \text{ for all f}$$ (24)

it follows from (23) that $$L = \log_2 n/q,$$ (25)

furthermore it is noted, after using (25) in expressions (17) and (18), that for the assumed stage invariant expression for $w_f$ (24) the computational burden of the APT forward transformation is given by the more compact expressions $$2^q n \log_2 n/q \text{ multiplications}$$ (26)

and $$(2^q - 1) n \log_2 n/q \text{ additions};$$ (27)

and h) E is an energy sequencer unitary transformation matrix of dimension n×n characterized by a sparse structure and composed of exactly n unity elements; the objective of this matrix is to organize the energy of the elements of the coefficient innovation vector $\Delta c(k)$ in an ascending order, as required by FIG. 1, where further details regarding the design of this matrix will be considered shortly when discussing our illustrative example.

The sparse unitary transformation matrix $H_f$ is defined by the following three expressions:

$$H_f = \begin{bmatrix} {}^fH_0^{w_f} & [0] & \cdots & [0] \\ [0] & {}^fH_1^{w_f} & \cdots & [0] \\ \cdots & \cdots & \cdots & \cdots \\ [0] & [0] & \cdots & {}^fH_{2^{S_f}-1}^{w_f} \end{bmatrix} \quad (28)$$

$${}^fH_g^{w_f} = \begin{bmatrix} R_{1+gw_f,1+gw_f}^f & R_{1+gw_f,2+gw_f}^f & \cdots & R_{1+gw_f,w_f+gw_f}^f \\ R_{2+gw_f,1+gw_f}^f & R_{2+gw_f,2+gw_f}^f & \cdots & R_{2+gw_f,w_f+gw_f}^f \\ \cdots & \cdots & \cdots & \cdots \\ R_{w_f+gw_f,1+gw_f}^f & R_{w_f+gw_f,2+gw_f}^f & \cdots & R_{w_f+gw_f,w_f+gw_f}^f \end{bmatrix} \quad (29)$$

$$R_{i,j}^f = \begin{bmatrix} r_{1+iz_f,1+jz_f}^f & 0 & \cdots & 0 \\ 0 & r_{2+iz_f,2+jz_f}^f & \cdots & 0 \\ \cdots & \cdots & \cdots & \cdots \\ 0 & 0 & \cdots & r_{z_f+iz_f,z_f+jz_f}^f \end{bmatrix} \quad (30)$$

where: a) $S_f$ is a nonnegative integer number given by the following recursive expression $$S_f = \begin{cases} S_f + 1, & w_{f-1} \leq w_f \\ S_f + \log_{w_f} w_{f-1}, & w_{f-1} > w_f \end{cases} \quad (31)$$

$$S_0 = 0; \quad (32)$$

b) the dimension $z_f$ of the $z_f \times z_f$ diagonal matrix $$R_{i,j}^f$$

is given by the following expression $$z_f = 2^{-S_f} n / w_f; \quad (33)$$

c)

$${}^fH_g^{w_f}$$

for all g is a $z_f w_f \times z_f w_f$ multi-diagonal, more specifically $(2w_f-1)$-diagonal, matrix consisting of $w_f^2$ diagonal submatrices, $$\{R_{i,j}^f\};$$

d) $H_f$ is a sparse matrix-diagonal matrix consisting of $2^f(2w_f-1)$-diagonal matrices, $$\{{}^fH_g^{w_f}\};$$

e) $H_f$ consists of $$nw_f \text{ nonzero elements} \quad (34)$$

and $$n(n-w_f) \text{ zero elements}; \quad (35)$$

and f) the $nw_f$ nonzero elements of $H_f$ are determined via a $w_f \times w_f$ eigensystem equation to be defined next after an illustrative example is considered.

The sparse structure of $H_f$ is now illustrated using the image compression example of FIG. 2 with $w_f=2$ for all f values. It is first noted that the number of $H_f$ stages L for the APT forward transformation of FIG. 3 is three, i.e., from (25) it follows that L=3 since q=1, as implied from our assumption that $w_f=2$ for all f, and n=8 for our example. Making use of expressions (28) thru (33) the following consolidated expressions are then found for $H_0$, $H_1$ and $H_2$:

$$H_0 = \begin{bmatrix} r_{1,1}^0 & 0 & 0 & 0 & r_{1,5}^0 & 0 & 0 & 0 \\ 0 & r_{2,2}^0 & 0 & 0 & 0 & r_{2,6}^0 & 0 & 0 \\ 0 & 0 & r_{3,3}^0 & 0 & 0 & 0 & r_{3,7}^0 & 0 \\ 0 & 0 & 0 & r_{4,4}^0 & 0 & 0 & 0 & r_{4,8}^0 \\ r_{5,1}^0 & 0 & 0 & 0 & r_{5,5}^0 & 0 & 0 & 0 \\ 0 & r_{6,2}^0 & 0 & 0 & 0 & r_{6,6}^0 & 0 & 0 \\ 0 & 0 & r_{7,3}^0 & 0 & 0 & 0 & r_{7,7}^0 & 0 \\ 0 & 0 & 0 & r_{8,4}^0 & 0 & 0 & 0 & r_{8,8}^0 \end{bmatrix}, \quad (36)$$

$$H_1 = \begin{bmatrix} r_{1,1}^1 & 0 & r_{1,3}^1 & 0 & 0 & 0 & 0 & 0 \\ 0 & r_{2,2}^1 & 0 & r_{2,4}^1 & 0 & 0 & 0 & 0 \\ r_{3,1}^1 & 0 & r_{3,3}^1 & 0 & 0 & 0 & 0 & 0 \\ 0 & r_{4,2}^1 & 0 & r_{4,4}^1 & 0 & 0 & 0 & 0 \\ 0 & 0 & 0 & 0 & r_{5,5}^1 & 0 & r_{5,7}^1 & 0 \\ 0 & 0 & 0 & 0 & 0 & r_{6,6}^1 & 0 & r_{6,8}^1 \\ 0 & 0 & 0 & 0 & r_{7,5}^1 & 0 & r_{7,7}^1 & 0 \\ 0 & 0 & 0 & 0 & 0 & r_{8,6}^1 & 0 & r_{8,8}^1 \end{bmatrix}, \quad (37)$$

and $$H_2 = \begin{bmatrix} r_{1,1}^2 & r_{1,2}^2 & 0 & 0 & 0 & 0 & 0 & 0 \\ r_{2,1}^2 & r_{2,2}^2 & 0 & 0 & 0 & 0 & 0 & 0 \\ 0 & 0 & r_{3,3}^2 & r_{3,4}^2 & 0 & 0 & 0 & 0 \\ 0 & 0 & r_{4,3}^2 & r_{4,4}^2 & 0 & 0 & 0 & 0 \\ 0 & 0 & 0 & 0 & r_{5,5}^2 & r_{5,6}^2 & 0 & 0 \\ 0 & 0 & 0 & 0 & r_{6,5}^2 & r_{6,6}^2 & 0 & 0 \\ 0 & 0 & 0 & 0 & 0 & 0 & r_{7,7}^2 & r_{7,8}^2 \\ 0 & 0 & 0 & 0 & 0 & 0 & r_{8,7}^2 & r_{8,8}^2 \end{bmatrix}. \quad (38)$$

From the above $H_f$ structures it is noted that only sixteen (16) out of the $n^2=64$ elements of $H_0$, $H_1$ or $H_2$ are nonzero values, this also confirms expression (34) which yields the same number of nonzero values when n=8 and $w_f$=2. Using expressions (26) and (27), it is also noted that the computational burden associated with the APT forward transformation of the present invention shown in FIG. 3b is given by:

$$48 \text{ multiplications and 24 additions.} \qquad (39)$$

Since the corresponding number of multiplications and additions for the traditional forward transformation technique of FIG. 3a is 64 and 56, respectively, this example confirms the expected acceleration obtained with the present embodiment. Expression (9) as disclosed above demonstrates the multiplication and addition constraints of traditional designs which yield the 64 and 56 values. Clearly the acceleration will be much greater for real-world examples where the dimension of the input signal n is large, say n=256, and the value of $w_f$ is small for all f, say $w_f$=2 for all f. In this case, it can be readily seen from expressions (9), (26) and (27) that the present embodiment's APT scheme yields factors of 16 and 32 improvements for the required number of multiplications and additions, while the traditional forward transformation scheme yields factors of 65536 and 65289 respectively for the required number of multiplications and additions. Finally under the assumption that the computational burden associated with the energy sequencer matrix E is negligible, it is noted that expressions (36)–(38) can be used in conjunction with expression (19) to directly confirm the validity of expressions (17) and (18) with respect to our simple example of FIG. 2.

The $w_f \times w_f$ eigensystem equation from which all the elements of $H_f$ for all f=0, 2, . . . , L–1 may be designed is given by $$^hK_f {}^hR_f = {}^hR_f {}^h\Lambda_f \qquad (40)$$

where $^hK_f$, $^hR_f$ and $^h\Lambda_f$ are $w_f \times w_f$ innovation covariance, eigenvector and eigenvalue matrices defined as follows:

$$^hK_f = \begin{bmatrix} k^f_{h,h} & k^f_{h,h+z_f} & \cdots & k^f_{h,h+(w_f-1)z_f} \\ k^f_{h+z_f,h} & k^f_{h+z_f,h+z_f} & \cdots & k^f_{h+z_f,h+(w_f-1)z_f} \\ \cdots & \cdots & \cdots & \cdots \\ k^f_{h+(w_f-1)z_f,h} & k^f_{h+(w_f-1)z_f,h+z_f} & \cdots & k^f_{h+(w_f-1)z_f,h+(w_f-1)z_f} \end{bmatrix}, \qquad (41)$$

$$^hR_f = \begin{bmatrix} r^f_{h,h} & r^f_{h,h+z_f} & \cdots & r^f_{h,h+(w_f-1)z_f} \\ r^f_{h+z_f,h} & r^f_{h+z_f,h+z_f} & \cdots & r^f_{h+z_f,h+(w_f-1)z_f} \\ \cdots & \cdots & \cdots & \cdots \\ r^f_{h+(w_f-1)z_f,h} & r^f_{h+(w_f-1)z_f,h+z_f} & \cdots & r^f_{h+(w_f-1)z_f,h+(w_f-1)z_f} \end{bmatrix}, \qquad (42)$$

and $$^h\Lambda_f = \begin{bmatrix} \lambda^f_h & 0 & \cdots & 0 \\ 0 & \lambda^f_{h+z_f} & \cdots & 0 \\ \cdots & \cdots & \cdots & \cdots \\ 0 & 0 & \cdots & \lambda^f_{h+(w_f-1)z_f} \end{bmatrix} \qquad (43)$$

where: a) the matrix index h has $n/w_f$ possible realizations defined by $$h=1+gw_f z_f, 2+gw_f z_f \ldots z_f+gw_f z_f \qquad (44)$$

with g having $2^{S_f}$ possible realizations $$g=0, 1, \ldots, 2^{S_f}-1 \qquad (45)$$

b) the set of innovation covariance elements $$\{k^f_{i,j}\}$$

of (41) are found directly from a f-th iteration n×n innovation covariance matrix $K_f$, to be defined shortly, where $$k^f_{i,j}$$

is the i-th row and j-th column element of $K_f$; c) the set of transformation elements $$\{r^f_{i,j}\}$$

of (42) for all possible values of h are the same as those of the $$2^{s_f} w_f^2$$

diagonal sub-matrices, $$\{R^f_{i,j}\},$$

see expressions (28)–(30); and d) the set of transformation elements $$\{r^f_{i,j}\}$$

of (42) and the set of eigenvalues $$\{\lambda^f_i\}$$

of (43) result from the solution of the eigensystem design equation (40).

Finally, the f-th iteration n×n innovation covariance matrix $K_f$, from which the set of elements $$\{k^f_{i,j}\}$$

of (41) are obtained is found recursively from the following expression $$K_{f+1} = H_f^t K_f H_f \text{ for } f=0, 1, \ldots L-1 \qquad (46)$$

where the initial value for $K_f$, $K_0$, is the same as the innovation covariance K of (2), i.e., $$K_0=K. \qquad (47)$$

The solution of the eigensystem (40) is now illustrated with our image compression example of FIG. 2. We begin by using (11) in (47) to yield $$K_0 = \begin{bmatrix} 12.77 & 6.18 & 3.19 & 1.93 & 6.35 & 6.60 & 4.68 & 3.26 \\ 6.18 & 16.49 & 8.44 & 4.81 & 6.86 & 11.82 & 10.52 & 7.62 \\ 3.19 & 8.44 & 18.06 & 9.94 & 5.05 & 10.70 & 14.75 & 13.07 \\ 1.93 & 4.81 & 9.94 & 20.66 & 3.80 & 8.20 & 13.74 & 18.53 \\ 6.35 & 6.86 & 5.05 & 3.80 & 17.79 & 12.92 & 9.42 & 7.17 \\ 6.60 & 11.82 & 10.70 & 8.20 & 12.97 & 27.41 & 20.00 & 15.07 \\ 4.68 & 10.52 & 14.75 & 13.74 & 9.42 & 20.00 & 32.94 & 25.05 \\ 3.26 & 7.62 & 13.07 & 18.53 & 7.17 & 15.07 & 25.05 & 38.62 \end{bmatrix}. \quad (48)$$

We then proceed to find all the nonzero elements of $H_0$ by solving the following four 2×2 eigensystem design equations:

$$\begin{bmatrix} k_{1,1}^0 & k_{1,5}^0 \\ k_{5,1}^0 & k_{5,5}^0 \end{bmatrix} \begin{bmatrix} r_{1,1}^0 & r_{1,5}^0 \\ r_{5,1}^0 & r_{5,5}^0 \end{bmatrix} = \begin{bmatrix} r_{1,1}^0 & r_{1,5}^0 \\ r_{5,1}^0 & r_{5,5}^0 \end{bmatrix} \begin{bmatrix} \lambda_1^0 & 0 \\ 0 & \lambda_5^0 \end{bmatrix} \quad (49)$$

$$\begin{bmatrix} k_{2,2}^0 & k_{2,6}^0 \\ k_{6,2}^0 & k_{6,6}^0 \end{bmatrix} \begin{bmatrix} r_{2,2}^0 & r_{2,6}^0 \\ r_{6,2}^0 & r_{6,6}^0 \end{bmatrix} = \begin{bmatrix} r_{2,2}^0 & r_{2,6}^0 \\ r_{6,2}^0 & r_{6,6}^0 \end{bmatrix} \begin{bmatrix} \lambda_2^0 & 0 \\ 0 & \lambda_6^0 \end{bmatrix} \quad (50)$$

$$\begin{bmatrix} k_{3,3}^0 & k_{3,7}^0 \\ k_{7,3}^0 & k_{7,7}^0 \end{bmatrix} \begin{bmatrix} r_{3,3}^0 & r_{3,7}^0 \\ r_{7,3}^0 & r_{7,7}^0 \end{bmatrix} = \begin{bmatrix} r_{3,3}^0 & r_{3,7}^0 \\ r_{7,3}^0 & r_{7,7}^0 \end{bmatrix} \begin{bmatrix} \lambda_3^0 & 0 \\ 0 & \lambda_7^0 \end{bmatrix} \quad (51)$$

and $$\begin{bmatrix} k_{4,4}^0 & k_{4,8}^0 \\ k_{8,4}^0 & k_{8,8}^0 \end{bmatrix} \begin{bmatrix} r_{4,4}^0 & r_{4,8}^0 \\ r_{8,4}^0 & r_{8,8}^0 \end{bmatrix} = \begin{bmatrix} r_{4,4}^0 & r_{4,8}^0 \\ r_{8,4}^0 & r_{8,8}^0 \end{bmatrix} \begin{bmatrix} \lambda_4^0 & 0 \\ 0 & \lambda_8^0 \end{bmatrix} \quad (52)$$

where, for instance, the innovation covariance matrix of (49) is obtained from (48) and is given by $$\begin{bmatrix} k_{1,1}^0 & k_{1,5}^0 \\ k_{5,1}^0 & k_{5,5}^0 \end{bmatrix} = \begin{bmatrix} 12.77 & 6.35 \\ 6.35 & 17.79 \end{bmatrix}. \quad (53)$$

Using expression (53) in (49) the following eigenvector and eigenvalue matrices are obtained:

$$\begin{bmatrix} r_{1,1}^0 & r_{1,5}^0 \\ r_{5,1}^0 & r_{5,5}^0 \end{bmatrix} = \begin{bmatrix} -0.8269 & 0.5623 \\ 0.5623 & 0.8269 \end{bmatrix} \text{ and} \quad (54)$$

$$\begin{bmatrix} \lambda_1^0 & 0 \\ 0 & \lambda_5^0 \end{bmatrix} = \begin{bmatrix} 8.4519 & 0 \\ 0 & 22.1081 \end{bmatrix}$$

The remaining design equations (50)–(52) are then solved in a similar fashion as (49) resulting in the following expression for $H_0$:

$$H_0 = \begin{bmatrix} -.8269 & 0 & 0 & 0 & .5623 & 0 & 0 & 0 \\ 0 & -.8423 & 0 & 0 & 0 & .5390 & 0 & 0 \\ 0 & 0 & -.8516 & 0 & 0 & 0 & .5241 & 0 \\ 0 & 0 & 0 & -.8474 & 0 & 0 & 0 & .5310 \\ .5623 & 0 & 0 & 0 & .8269 & 0 & 0 & 0 \\ 0 & .5390 & 0 & 0 & 0 & .8423 & 0 & 0 \\ 0 & 0 & .5241 & 0 & 0 & 0 & .8516 & 0 \\ 0 & 0 & 0 & .5310 & 0 & 0 & 0 & .8474 \end{bmatrix} \quad (55)$$

Using expressions (48) and (55) for $K_0$ and $H_0$ in the recursive expression (46) the following result is then obtained for $K_1$:

$$K_1 = \begin{bmatrix} 8.44 & 2.03 & 0.58 & 0.25 & 0 & 0.85 & 1.32 & 1.42 \\ 2.03 & 8.91 & 2.15 & 0.60 & 0.05 & 0 & 0.93 & 1.64 \\ 0.58 & 2.15 & 8.97 & 2.14 & 0.38 & 0.25 & 0 & 1.02 \\ 0.25 & 0.60 & 2.14 & 9.05 & 0.54 & 0.87 & 0.63 & 0 \\ 0 & 0.05 & 0.38 & 0.54 & 22.10 & 17.04 & 11.99 & 8.81 \\ 0.85 & 0 & 0.25 & 0.87 & 17.04 & 34.94 & 26.26 & 19.26 \\ 1.32 & 0.93 & 0 & 0.63 & 11.99 & 26.26 & 41.99 & 32.83 \\ 1.42 & 1.64 & 1.02 & 0 & 8.81 & 19.26 & 32.83 & 50.18 \end{bmatrix} \quad (56)$$

All the nonzero elements of $H_1$ are next found by solving the following four 2×2 eigensystem design equations:

$$\begin{bmatrix} k^1_{1,1} & k^1_{1,3} \\ k^1_{3,1} & k^1_{3,3} \end{bmatrix} \begin{bmatrix} r^1_{1,1} & r^1_{1,3} \\ r^1_{3,1} & r^1_{3,3} \end{bmatrix} = \begin{bmatrix} r^1_{1,1} & r^1_{1,3} \\ r^1_{3,1} & r^1_{3,3} \end{bmatrix} \begin{bmatrix} \lambda^1_1 & 0 \\ 0 & \lambda^1_3 \end{bmatrix} \quad (57)$$

$$\begin{bmatrix} k^1_{2,2} & k^1_{2,4} \\ k^1_{4,2} & k^1_{4,4} \end{bmatrix} \begin{bmatrix} r^1_{2,2} & r^1_{2,4} \\ r^1_{4,2} & r^1_{4,4} \end{bmatrix} = \begin{bmatrix} r^1_{2,2} & r^1_{2,4} \\ r^1_{4,2} & r^1_{4,4} \end{bmatrix} \begin{bmatrix} \lambda^1_2 & 0 \\ 0 & \lambda^1_4 \end{bmatrix} \quad (58)$$

$$\begin{bmatrix} k^1_{5,5} & k^1_{5,7} \\ k^1_{7,5} & k^1_{7,7} \end{bmatrix} \begin{bmatrix} r^1_{5,5} & r^1_{5,7} \\ r^1_{7,5} & r^1_{7,7} \end{bmatrix} = \begin{bmatrix} r^1_{5,5} & r^1_{5,7} \\ r^1_{7,5} & r^1_{7,7} \end{bmatrix} \begin{bmatrix} \lambda^1_5 & 0 \\ 0 & \lambda^1_7 \end{bmatrix} \quad (59)$$

and $$\begin{bmatrix} k^1_{6,6} & k^1_{6,8} \\ k^1_{8,6} & k^1_{8,8} \end{bmatrix} \begin{bmatrix} r^1_{6,6} & r^1_{6,8} \\ r^1_{8,6} & r^1_{8,8} \end{bmatrix} = \begin{bmatrix} r^1_{6,6} & r^1_{6,8} \\ r^1_{8,6} & r^1_{8,8} \end{bmatrix} \begin{bmatrix} \lambda^1_6 & 0 \\ 0 & \lambda^1_8 \end{bmatrix}. \quad (60)$$

Using $K_1$ of (56) when solving (57)–(60) the following expression is then derived for $H_1$:

$$H_1 = \begin{bmatrix} -0.8413 & 0 & 0.5406 & 0 & 0 & 0 & 0 & 0 \\ 0 & -0.7470 & 0 & 0.6649 & 0 & 0 & 0 & 0 \\ 0.5406 & 0 & 0.8413 & 0 & 0 & 0 & 0 & 0 \\ 0 & 0.6649 & 0 & 0.7470 & 0 & 0 & 0 & 0 \\ 0 & 0 & 0 & 0 & -0.9051 & 0 & 0.4252 & 0 \\ 0 & 0 & 0 & 0 & 0 & -0.8270 & 0 & 0.5622 \\ 0 & 0 & 0 & 0 & 0.4252 & 0 & 0.9051 & 0 \\ 0 & 0 & 0 & 0 & 0 & 0.5622 & 0 & 0.8270 \end{bmatrix} \quad (61)$$

The last iteration innovation covariance matrix $K_2$ for our example is then derived by using expressions (56) and (61) for $K_1$ and $H_1$ in the recursive expression (46) to yield $$K_2 = \begin{bmatrix} 8.07 & 1.04 & 0 & 0.34 & -0.66 & 0.11 & -0.92 & -0.86 \\ 1.04 & 8.38 & -0.88 & 0 & -0.41 & -1.17 & -0.11 & -0.68 \\ 0 & -0.86 & 9.34 & 3.38 & 0.18 & 0.36 & 0.78 & 1.72 \\ 0.34 & 0 & 3.38 & 9.58 & 0.07 & 0.08 & 1.17 & 1.27 \\ -0.66 & -0.41 & 0.02 & 0.07 & 16.46 & 6.88 & 0 & 2.55 \\ 0.11 & -1.17 & 0.36 & 0.08 & 6.88 & 21.85 & -6.84 & 0 \\ -0.92 & -0.11 & 0.78 & 1.17 & 0 & -6.84 & 47.62 & 45.11 \\ -0.86 & -0.68 & 1.72 & 1.27 & 2.55 & 0 & 45.11 & 63.28 \end{bmatrix} \quad (62)$$

All the nonzero elements of $H_2$ are next found by solving the following four 2×2 eigensystem design equations:

$$\begin{bmatrix} k^2_{1,1} & k^2_{1,2} \\ k^2_{2,1} & k^2_{2,2} \end{bmatrix} \begin{bmatrix} r^2_{1,1} & r^2_{1,2} \\ r^2_{2,1} & r^2_{2,2} \end{bmatrix} = \begin{bmatrix} r^2_{1,1} & r^2_{1,2} \\ r^2_{2,1} & r^2_{2,2} \end{bmatrix} \begin{bmatrix} \lambda^2_1 & 0 \\ 0 & \lambda^2_2 \end{bmatrix} \quad (63)$$

$$\begin{bmatrix} k^2_{3,3} & k^2_{3,4} \\ k^2_{4,3} & k^2_{4,4} \end{bmatrix} \begin{bmatrix} r^2_{3,3} & r^2_{3,4} \\ r^2_{4,3} & r^2_{4,4} \end{bmatrix} = \begin{bmatrix} r^2_{3,3} & r^2_{3,4} \\ r^2_{4,3} & r^2_{4,4} \end{bmatrix} \begin{bmatrix} \lambda^2_3 & 0 \\ 0 & \lambda^2_4 \end{bmatrix} \quad (64)$$

$$\begin{bmatrix} k^2_{5,5} & k^2_{5,6} \\ k^2_{6,5} & k^2_{6,6} \end{bmatrix} \begin{bmatrix} r^2_{5,5} & r^2_{5,6} \\ r^2_{6,5} & r^0_{6,6} \end{bmatrix} = \begin{bmatrix} r^2_{5,5} & r^2_{5,6} \\ r^2_{6,5} & r^2_{6,6} \end{bmatrix} \begin{bmatrix} \lambda^2_5 & 0 \\ 0 & \lambda^2_6 \end{bmatrix} \quad (65)$$

and $$\begin{bmatrix} k^2_{7,7} & k^2_{7,8} \\ k^2_{8,7} & k^2_{8,8} \end{bmatrix} \begin{bmatrix} r^2_{7,7} & r^2_{7,8} \\ r^2_{8,7} & r^2_{8,8} \end{bmatrix} = \begin{bmatrix} r^2_{7,7} & r^2_{7,8} \\ r^2_{8,7} & r^2_{8,8} \end{bmatrix} \begin{bmatrix} \lambda^2_7 & 0 \\ 0 & \lambda^2_8 \end{bmatrix}. \quad (66)$$

Using $K_2$ of (62) when solving (63)–(66) the following expression is then derived for $H_2$:

$$H_2 = \begin{bmatrix} -.7508 & .6605 & 0 & 0 & 0 & 0 & 0 & 0 \\ .6605 & .7508 & 0 & 0 & 0 & 0 & 0 & 0 \\ 0 & 0 & -.7192 & .6948 & 0 & 0 & 0 & 0 \\ 0 & 0 & .6948 & .7192 & 0 & 0 & 0 & 0 \\ 0 & 0 & 0 & 0 & -.8268 & .5626 & 0 & 0 \\ 0 & 0 & 0 & 0 & .5626 & .8268 & 0 & 0 \\ 0 & 0 & 0 & 0 & 0 & 0 & -.7651 & .6439 \\ 0 & 0 & 0 & 0 & 0 & 0 & .6439 & .7651 \end{bmatrix} \quad (67)$$

As a preamble to the definition of the energy sequencer unitary matrix E, a Preliminary APT forward transformation matrix $\overline{R}$ is defined $$\overline{R}=H_0 H_1 \ldots H_{L-1}. \tag{68}$$

Multiplying the transpose of $\overline{R}$ by the input signal x(k+1) one then obtains a Preliminary APT coefficient vector $\tilde{c}'(k+1)$, i.e., $$\tilde{c}'(k+1)=\overline{R}^t x(k+1) \tag{69}$$

From (19), (68) and (69) it then follows that the relation between the APT coefficient vector $\tilde{c}(k+1)$ of (19) and the Preliminary APT coefficient vector $\tilde{c}'(k+1)$ of (69) is given by $$\tilde{c}(k+1)=E^t \tilde{c}'(k+1). \tag{70}$$

Next it is noted that the eigenvalues of $\overline{R}$ can be approximated by the main diagonal of the L-th iteration innovation covariance $K_L$. Denoting the Preliminary APT eigenvalue matrix of $\overline{R}$ by the n×n diagonal matrix $\overline{\Lambda}$, it then follows that $$\mathrm{diag}(\overline{\Lambda}) \approx \mathrm{diag}(K_L) \tag{71}$$

Also in the ideal case that occurs when the off-diagonal elements of $K_L$ are zero, it can be shown that the eigenvectors of the MMSE PT transformation matrix R and the Preliminary APT transformation matrix $\overline{R}$ are identical. This in turn implies that the main diagonal of $K_L$ will contain all the eigenvalues of the MMSE PT transformation matrix R, except that they will not appear necessarily in ascending order as they appear for the MMSE PT eigenvalue matrix $\Lambda$ illustrated in (15) for our simple example. The objective of the energy sequencer unitary matrix E is then to rearrange the eigenvectors of the Preliminary APT transformation matrix $\overline{R}$ such that their corresponding eigenvalues appear in ascending order as required by the PT source coder structure of FIG. 1. Since these eigenvalues denote the contributing energies associated with the elements of the innovation coefficient δc(k), it is then said that the function of the unitary matrix E is to serve as an energy sequencer or organizer for the elements of the innovation coefficient vector δc(k).

Next we illustrate the above methodology for obtaining E with the image example of FIG. 2. We begin by noticing from expression (19) that the Preliminary APT transformation $\overline{R}$ for our simple example is given by the product $$\overline{R}=H_0 H_1 H_2. \tag{72}$$

Using expressions (55), (61) and (67) for $H_0$, $H_1$ and $H_2$ in (72) we then obtain the following result for $\overline{R}$:

$$\overline{R} = \begin{bmatrix} -.5266 & 0.4548 & .3213 & -.3101 & .4205 & -.2871 & -.1830 & .1540 \\ .4103 & .4751 & -.3900 & -.4042 & -.2513 & -.3681 & .1950 & .2318 \\ .3481 & -.3006 & .5157 & -.4977 & -.1840 & .1256 & -.3630 & .3054 \\ -.3693 & -.4276 & -.4385 & -.4544 & .1683 & .2465 & .2827 & .3360 \\ .3583 & -.3094 & -.2186 & .2110 & .6180 & -.4219 & -.2690 & .2263 \\ -.2625 & -.3039 & .2495 & .2586 & -.3928 & -.5754 & .3049 & .3624 \\ -.2143 & .1850 & -.3174 & .3063 & -.2990 & .2041 & -.5898 & .4963 \\ .2314 & .2680 & .2748 & .2848 & .2686 & .3934 & .4512 & .5362 \end{bmatrix} \tag{73}$$

Next we determine the L-th iteration innovation covariance $K_L$ for our example, i.e., $K_3$, by substituting expressions (62) and (67) for $K_2$ and $H_2$ in (46) to yield $$K_3 = \begin{bmatrix} 7.18 & 0 & 0.23 & -0.58 & -0.67 & -0.57 & -0.35 & 0.56 \\ 0 & 9.27 & 0.63 & -0.30 & 0.15 & -1.08 & -0.17 & -1.27 \\ 0.23 & 0.63 & 6.08 & 0 & -0.15 & -0.15 & -0.42 & -0.11 \\ -0.58 & -0.30 & 0 & 12.84 & 0.12 & 0.29 & 0.30 & 2.51 \\ -0.67 & 0.15 & -0.15 & 0.12 & 11.77 & 0 & 1.59 & -4.10 \\ -0.57 & -1.08 & -0.15 & 0.29 & 0 & 26.54 & 5.25 & -2.53 \\ -0.35 & -0.17 & -0.43 & 0.30 & 1.59 & 5.25 & 9.67 & 0 \\ 0.56 & -1.27 & -0.11 & 2.51 & -4.10 & -2.53 & 0 & 101.24 \end{bmatrix} \tag{74}$$

Making use of (74) in (71) it then follows that the Preliminary APT eigenvalue matrix for $\overline{R}$, $\overline{\Lambda}$, is given by $$\overline{\Lambda} = \begin{bmatrix} 7.18 & 0 & 0 & 0 & 0 & 0 & 0 & 0 \\ 0 & 9.27 & 0 & 0 & 0 & 0 & 0 & 0 \\ 0 & 0 & 6.08 & 0 & 0 & 0 & 0 & 0 \\ 0 & 0 & 0 & 12.84 & 0 & 0 & 0 & 0 \\ 0 & 0 & 0 & 0 & 11.77 & 0 & 0 & 0 \\ 0 & 0 & 0 & 0 & 0 & 26.54 & 0 & 0 \\ 0 & 0 & 0 & 0 & 0 & 0 & 9.67 & 0 \\ 0 & 0 & 0 & 0 & 0 & 0 & 0 & 101.24 \end{bmatrix} \tag{75}$$

A comparison of expressions (14) and (15) for the MMSE PT transformation matrix R and corresponding eigenvalue matrix $\Lambda$ with expressions (73)–(75) of the Preliminary APT transformation matrix $\overline{R}$ and eigenvalue matrix $\overline{\Lambda}$ reveals the following two results:

The first result is that the main diagonal values of $K_3$ (74) are indeed approximations to the eigenvalues of the corresponding eigenvectors for $\overline{R}$. It is of interest to note that the off-diagonal elements of $K_3$ tend, in a general sense, to be significantly smaller than its main diagonal values for the example considered here. In addition, it is noted that the magnitudes of the main diagonal elements of $K_3$ approximate the eigenvalues of the MMSE PT transformation matrix R, e.g., the smallest value is 6.08 which is very close to the smallest eigenvalue of R which is 5.853, and the largest value is 101.24 which is even closer, using percentage change as criterion, to the largest eigenvalue of R which is 101.6.

The second result is that the energy sequencer unitary matrix E that will order the elements of the main diagonal of $K_3$, (74) or equivalently $\overline{\Lambda}$ (75) in ascending order is given by $$E = \begin{bmatrix} 0 & 1 & 0 & 0 & 0 & 0 & 0 & 0 \\ 0 & 0 & 1 & 0 & 0 & 0 & 0 & 0 \\ 1 & 0 & 0 & 0 & 0 & 0 & 0 & 0 \\ 0 & 0 & 0 & 0 & 0 & 1 & 0 & 0 \\ 0 & 0 & 0 & 0 & 1 & 0 & 0 & 0 \\ 0 & 0 & 0 & 0 & 0 & 0 & 1 & 0 \\ 0 & 0 & 0 & 1 & 0 & 0 & 0 & 0 \\ 0 & 0 & 0 & 0 & 0 & 0 & 0 & 1 \end{bmatrix}. \quad (76)$$

Multiplying the Preliminary APT transformation matrix $\overline{R}$ by the energy sequencer unitary matrix E one then obtains the desired APT transformation matrix $$\tilde{R} = \begin{bmatrix} .3213 & -.5266 & .4548 & -.1830 & .4205 & -.3101 & -.2871 & .1540 \\ -.3900 & .4103 & .4751 & .1950 & -.2513 & -.4042 & -.3681 & .2318 \\ .5157 & .3481 & -.3006 & -.3630 & -.1840 & -.4977 & .1256 & .3054 \\ -.4385 & -.3693 & -.4276 & .2827 & .1683 & -.4544 & .2465 & .3360 \\ -.2186 & .3583 & -.3094 & -.2690 & .6180 & .2110 & -.4219 & .2263 \\ .2495 & -.2625 & -.3039 & .3049 & -.3928 & .2586 & -.5754 & .3624 \\ -.3174 & -.2143 & .1850 & -.5898 & -.2990 & .3063 & .2041 & .4963 \\ .2748 & .2314 & .2680 & .4512 & .2686 & .2848 & .3934 & .5362 \end{bmatrix}. \quad (77)$$

Furthermore we denote the APT eigenvalue matrix of $\tilde{R}$ by the n×n diagonal matrix $\tilde{\Lambda}$. It can be shown that this matrix is related to the energy sequencer unitary matrix E and the Preliminary APT eigenvalue matrix $\overline{\Lambda}$ by the following relation $$\tilde{R} = E'\tilde{\Lambda}\tilde{\Lambda} = E'\overline{\Lambda}E. \quad (78)$$

Making use of (75) and (76) in (78) it then follows that $$\tilde{\Lambda} = \begin{bmatrix} 6.08 & 0 & 0 & 0 & 0 & 0 & 0 & 0 \\ 0 & 7.18 & 0 & 0 & 0 & 0 & 0 & 0 \\ 0 & 0 & 9.27 & 0 & 0 & 0 & 0 & 0 \\ 0 & 0 & 0 & 9.67 & 0 & 0 & 0 & 0 \\ 0 & 0 & 0 & 0 & 11.77 & 0 & 0 & 0 \\ 0 & 0 & 0 & 0 & 0 & 12.84 & 0 & 0 \\ 0 & 0 & 0 & 0 & 0 & 0 & 26.54 & 0 \\ 0 & 0 & 0 & 0 & 0 & 0 & 0 & 101.24 \end{bmatrix}. \quad (79)$$

At this juncture it will be shown how the APT transformation matrix (77) and corresponding APT eigenvalue matrix (79) can be further improved while yielding an on-line computational burden very close to that of (39). This is done by using a so-called "Booster Stage" with $w_0=4$ that boosts by a factor of two the number of nonzero elements of the initial computational block $H_0$, see expression (36) for the case where $w_0=2$, and then employing the lower value of $w_f=2$ for the remaining f=1 stage; it should be noted from expression (23) that the number of $H_f$ stages L is now given by two for our simple example, i.e., L=2 since $$\log_2(w_0=4) + \log_2(w_1=2) = \log_2(n=8). \tag{80}$$

Using the same methodology used to derive expressions (77) and (79) it is first found that $H_0$ and $H_1$ have the following structure:

$$H_0 = \begin{bmatrix} r^0_{1,1} & 0 & r^0_{1,3} & 0 & r^0_{1,5} & 0 & r^0_{1,7} & 0 \\ 0 & r^0_{2,2} & 0 & r^0_{2,4} & 0 & r^0_{2,6} & 0 & r^0_{2,8} \\ r^0_{3,1} & 0 & r^0_{3,3} & 0 & r^0_{3,5} & 0 & r^0_{3,7} & 0 \\ 0 & r^0_{4,2} & 0 & r^0_{4,4} & 0 & r^0_{4,6} & 0 & r^0_{4,8} \\ r^0_{5,1} & 0 & r^0_{5,3} & 0 & r^0_{5,5} & 0 & r^0_{5,7} & 0 \\ 0 & r^0_{6,2} & 0 & r^0_{6,4} & 0 & r^0_{6,6} & 0 & r^0_{6,8} \\ r^0_{7,1} & 0 & r^0_{7,3} & 0 & r^0_{7,5} & 0 & r^0_{7,7} & 0 \\ 0 & r^0_{8,2} & 0 & r^0_{8,4} & 0 & r^0_{8,6} & 0 & r^0_{8,8} \end{bmatrix} \tag{81}$$

and $$H_1 = \begin{bmatrix} r^1_{1,1} & r^1_{1,2} & 0 & 0 & 0 & 0 & 0 & 0 \\ r^1_{2,1} & r^1_{2,2} & 0 & 0 & 0 & 0 & 0 & 0 \\ 0 & 0 & r^1_{3,3} & r^1_{3,4} & 0 & 0 & 0 & 0 \\ 0 & 0 & r^1_{4,3} & r^1_{4,4} & 0 & 0 & 0 & 0 \\ 0 & 0 & 0 & 0 & r^1_{5,5} & r^1_{5,6} & 0 & 0 \\ 0 & 0 & 0 & 0 & r^1_{6,5} & r^1_{6,6} & 0 & 0 \\ 0 & 0 & 0 & 0 & 0 & 0 & r^1_{7,7} & r^1_{7,8} \\ 0 & 0 & 0 & 0 & 0 & 0 & r^1_{8,7} & r^1_{8,8} \end{bmatrix} \tag{82}$$

Note from (81) that the computational block $H_0$ now has four nonzero elements for each of its rows and columns as opposed to two nonzero elements for the previous example which is shown in (36).

The nonzero elements of the new $H_0$ are then found from the following two 4×4 eigensystem equations:

$$\begin{bmatrix} k^0_{1,1} & k^0_{1,3} & k^0_{1,5} & k^0_{1,7} \\ k^0_{3,1} & k^0_{3,3} & k^0_{3,5} & k^0_{3,7} \\ k^0_{5,1} & k^0_{5,3} & k^0_{5,5} & k^0_{5,7} \\ k^0_{7,1} & k^0_{7,3} & k^0_{7,5} & k^0_{7,7} \end{bmatrix} \begin{bmatrix} r^0_{1,1} & r^0_{1,3} & r^0_{1,5} & r^0_{1,7} \\ r^0_{3,1} & r^0_{3,3} & r^0_{3,5} & r^0_{3,7} \\ r^0_{5,1} & r^0_{5,3} & r^0_{5,5} & r^0_{5,7} \\ r^0_{7,1} & r^0_{7,3} & r^0_{7,5} & r^0_{7,7} \end{bmatrix} = \begin{bmatrix} r^0_{1,1} & r^0_{1,3} & r^0_{1,5} & r^0_{1,7} \\ r^0_{3,1} & r^0_{3,3} & r^0_{3,5} & r^0_{3,7} \\ r^0_{5,1} & r^0_{5,3} & r^0_{5,5} & r^0_{5,7} \\ r^0_{7,1} & r^0_{7,3} & r^0_{7,5} & r^0_{7,7} \end{bmatrix} \begin{bmatrix} \lambda^0_1 & 0 & 0 & 0 \\ 0 & \lambda^0_3 & 0 & 0 \\ 0 & 0 & \lambda^0_5 & 0 \\ 0 & 0 & 0 & \lambda^0_7 \end{bmatrix} \tag{83}$$

and $$\begin{bmatrix} k^0_{2,2} & k^0_{2,4} & k^0_{2,6} & k^0_{2,8} \\ k^0_{4,2} & k^0_{4,4} & k^0_{4,6} & k^0_{4,8} \\ k^0_{6,2} & k^0_{6,4} & k^0_{6,6} & k^0_{6,8} \\ k^0_{8,2} & k^0_{8,4} & k^0_{8,6} & k^0_{8,8} \end{bmatrix} \begin{bmatrix} r^0_{2,2} & r^0_{2,4} & r^0_{2,6} & r^0_{2,8} \\ r^0_{4,2} & r^0_{4,4} & r^0_{4,6} & r^0_{4,8} \\ r^0_{6,2} & r^0_{6,4} & r^0_{6,6} & r^0_{6,8} \\ r^0_{8,2} & r^0_{8,4} & r^0_{8,6} & r^0_{8,8} \end{bmatrix} = \begin{bmatrix} r^0_{2,2} & r^0_{2,4} & r^0_{2,6} & r^0_{2,8} \\ r^0_{4,2} & r^0_{4,4} & r^0_{4,6} & r^0_{4,8} \\ r^0_{6,2} & r^0_{6,4} & r^0_{6,6} & r^0_{6,8} \\ r^0_{8,2} & r^0_{8,4} & r^0_{8,6} & r^0_{8,8} \end{bmatrix} \begin{bmatrix} \lambda^0_2 & 0 & 0 & 0 \\ 0 & \lambda^0_4 & 0 & 0 \\ 0 & 0 & \lambda^0_6 & 0 \\ 0 & 0 & 0 & \lambda^0_8 \end{bmatrix} \tag{84}$$

On the other hand, the nonzero elements of $H_1$ are found by solving the following four 2×2 eigensystem design equations:

$$\begin{bmatrix} k^1_{1,1} & k^1_{1,2} \\ k^1_{2,1} & k^1_{2,2} \end{bmatrix} \begin{bmatrix} r^1_{1,1} & r^1_{1,2} \\ r^1_{2,1} & r^1_{2,2} \end{bmatrix} = \begin{bmatrix} r^1_{1,1} & r^1_{1,2} \\ r^1_{2,1} & r^1_{2,2} \end{bmatrix} \begin{bmatrix} \lambda^1_1 & 0 \\ 0 & \lambda^1_2 \end{bmatrix} \tag{85}$$

$$\begin{bmatrix} k^1_{3,3} & k^1_{3,4} \\ k^1_{4,3} & k^1_{4,4} \end{bmatrix} \begin{bmatrix} r^1_{3,3} & r^1_{3,4} \\ r^1_{4,3} & r^1_{4,4} \end{bmatrix} = \begin{bmatrix} r^1_{3,3} & r^1_{3,4} \\ r^1_{4,3} & r^1_{4,4} \end{bmatrix} \begin{bmatrix} \lambda^1_3 & 0 \\ 0 & \lambda^1_4 \end{bmatrix} \tag{86}$$

$$\begin{bmatrix} k^1_{5,5} & k^1_{5,6} \\ k^1_{6,5} & k^1_{6,6} \end{bmatrix} \begin{bmatrix} r^1_{5,5} & r^1_{5,6} \\ r^1_{6,5} & r^1_{6,6} \end{bmatrix} = \begin{bmatrix} r^1_{5,5} & r^1_{5,6} \\ r^1_{6,5} & r^1_{6,6} \end{bmatrix} \begin{bmatrix} \lambda^1_5 & 0 \\ 0 & \lambda^1_6 \end{bmatrix} \tag{87}$$

and $$\begin{bmatrix} k^1_{7,7} & k^1_{7,8} \\ k^1_{8,7} & k^1_{8,8} \end{bmatrix} \begin{bmatrix} r^1_{7,7} & r^1_{7,8} \\ r^1_{8,7} & r^1_{8,8} \end{bmatrix} = \begin{bmatrix} r^1_{7,7} & r^1_{7,8} \\ r^1_{8,7} & r^1_{8,8} \end{bmatrix} \begin{bmatrix} \lambda^1_7 & 0 \\ 0 & \lambda^1_8 \end{bmatrix}. \tag{88}$$

Solving the innovation covariance recursive equation (46) in conjunction with expressions (81) thru (88) the following results are obtained for the Preliminary APT Transformation $\overline{R} = H_0 H_1$ and the L-th iteration innovation covariance $K_L = K_2$ $$\bar{R} = \begin{bmatrix} .3372 & -.4699 & .4660 & -.2931 & -.2377 & .4207 & -.3358 & .1274 \\ -.5274 & .2453 & .3349 & -.4676 & .3632 & -.1442 & -.3461 & .2417 \\ .5026 & .3813 & -.2134 & -.5197 & -.2906 & -.3240 & .0451 & .3080 \\ -.2779 & -.4556 & -.5068 & -.3950 & .1027 & .2534 & .3625 & .3103 \\ -.2257 & .3758 & -.3633 & .1915 & -.3692 & .5071 & -.4419 & .2245 \\ .3512 & -.2052 & -.2719 & .3008 & .5424 & -.1601 & -.4304 & .4063 \\ -.2915 & -.2812 & .1742 & .3060 & -.4901 & -.4648 & .0317 & .5047 \\ .1381 & .3220 & .3635 & .2205 & .2141 & .3664 & .5025 & .5138 \end{bmatrix} \quad (89)$$

and $$K_2 = \begin{bmatrix} 5.94 & 0 & 0 & 0 & -0.33 & -0.31 & -0.52 & -0.33 \\ 0 & 7.07 & 0 & 0 & 0 & -0.28 & -0.30 & -0.30 \\ 0 & 0 & 9.29 & 0 & 0.10 & 0.08 & 0.27 & 0.06 \\ 0 & 0 & 0 & 12.84 & 0.06 & 0.34 & 0.40 & 0.57 \\ -0.33 & 0 & 0.10 & 0.06 & 7.55 & 0 & 0 & 0 \\ -0.31 & -0.28 & 0.08 & 0.34 & 0 & 12.25 & 0 & 0 \\ -0.52 & -0.30 & 0.27 & 0.40 & 0 & 0 & 28.04 & 0 \\ -0.33 & -0.30 & 0.06 & 0.57 & 0 & 0 & 0 & 101.59 \end{bmatrix} \quad (90)$$

Next it is noted that the energy sequencer unitary matrix E (70) that will organize the diagonal elements of $K_2$ (90) in ascending order is given by the following expression:

$$E = \begin{bmatrix} 1 & 0 & 0 & 0 & 0 & 0 & 0 & 0 \\ 0 & 1 & 0 & 0 & 0 & 0 & 0 & 0 \\ 0 & 0 & 0 & 1 & 0 & 0 & 0 & 0 \\ 0 & 0 & 0 & 0 & 0 & 1 & 0 & 0 \\ 0 & 0 & 1 & 0 & 0 & 0 & 0 & 0 \\ 0 & 0 & 0 & 0 & 1 & 0 & 0 & 0 \\ 0 & 0 & 0 & 0 & 0 & 0 & 1 & 0 \\ 0 & 0 & 0 & 0 & 0 & 0 & 0 & 1 \end{bmatrix} \quad (91)$$

Making use of expressions (89) and (91) in (19) and (78) we then obtain the following expressions for the desired APT transformation matrix $\tilde{R}$ and corresponding APT eigenvalue matrix $\tilde{\Lambda}$.

$$\tilde{R} = \begin{bmatrix} .3372 & -.4699 & -.2377 & .4660 & .4207 & -.2931 & -.3358 & .1274 \\ -.5274 & .2453 & .3632 & .3349 & -.1442 & -.4676 & -.3461 & .2417 \\ .5026 & .3813 & -.2906 & -.2134 & -.3240 & -.5197 & .0451 & .3080 \\ -.2779 & -.4556 & .1027 & -.5068 & .2534 & -.3950 & .3625 & .3103 \\ -.2257 & .3758 & -.3692 & -.3633 & .5071 & .1915 & -.4419 & .2245 \\ .3512 & -.2052 & .5424 & -.2719 & -.1601 & .3008 & -.4304 & .4063 \\ -.2915 & -.2812 & -.4901 & .1742 & -.4648 & .3060 & .0317 & .5047 \\ .1381 & .3220 & .2141 & .3635 & .3664 & .2205 & .5025 & .5138 \end{bmatrix} \quad (92)$$

and $$\tilde{\Lambda} = \begin{bmatrix} 5.94 & 0 & 0 & 0 & 0 & 0 & 0 & 0 \\ 0 & 7.07 & 0 & 0 & 0 & 0 & 0 & 0 \\ 0 & 0 & 7.55 & 0 & 0 & 0 & 0 & 0 \\ 0 & 0 & 0 & 9.29 & 0 & 0 & 0 & 0 \\ 0 & 0 & 0 & 0 & 12.25 & 0 & 0 & 0 \\ 0 & 0 & 0 & 0 & 0 & 12.84 & 0 & 0 \\ 0 & 0 & 0 & 0 & 0 & 0 & 28.04 & 0 \\ 0 & 0 & 0 & 0 & 0 & 0 & 0 & 101.59 \end{bmatrix} \quad (93)$$

Finally the on-line computational burden associated with the Booster scheme is noted from (17) and (18) to be given by $$8(4+2)=48 \text{ multiplications and } 8(3+1)=32 \text{ additions} \tag{94}$$

A comparison of expressions (92)–(93) and (77)–(79) with the MMSE PT eigenvector and eigenvalue matrices (14) and (15) reveals a noticeable improvement in the approximations due to the use of our Booster algorithm. It is also noticed from a comparison of the computational burdens (39) and (92) for the two algorithms that the approximation improvements of the Booster algorithm are obtained with a negligible increase in the on-line computational burden, i.e., only eight additional additions are needed for the Booster algorithm. With regard to the design computational burden, off-line and/or on-line, the need for the solution of the two 4×4 eigensystem expressions (83) and (84) for the Booster computational block $H_0$ is not as efficient as the solution of the 2×2 eigensystem equations required by the first algorithm, see for instance expressions (49)–(52); it should be noted, however, that for our image compression application the design computational burden is of not practical concern since it is done off-line without regard to the design time used.

In FIG. 4 the backward transformation apparatus of the APT invention is depicted and compared with that of the MMSE PT scheme. From this figure it is noted that the MMSE PT backward transformation apparatus of FIG. 1, consisting of a single transformation block that performs $n^2$ multiplications and $n(n-1)$ additions when evaluating the expression $$\hat{x}(k+1)=R\hat{c}(k+1), \tag{95}$$

is substituted with L+1 computational blocks that require $$n\sum_{i=0}^{L-1} w_i \text{ multiplications} \tag{96}$$

and $$n\sum_{i=0}^{L-1} (w_i - 1) \text{ additions} \tag{97}$$

in the evaluation of the expression $$\tilde{x}(k+1)=\tilde{R}\hat{c}(k+1) \text{ with } \tilde{R}=H_0H_1\ldots H_{L-1}E \tag{98}$$

where all the parameters of FIG. 4 are defined similarly as those for FIG. 3.

The forward prediction apparatus of the APT invention is depicted in FIG. 5 and compared with that of the MMSE PT scheme. The MMSE PT forward prediction apparatus of FIG. 1, consisting of a single prediction block that performs nm real multiplications and n(m−1) real additions when evaluating the expression $$c'(k+1)=P'z(k), \tag{99}$$

is substituted with L+3 computational blocks where: a) $\bar{z}(k)$ is an integer vector of dimension m×1 that is obtained by rounding the real prediction vector z(k), i.e., $$\bar{z}(k)=\text{Round}(z(k)); \tag{100}$$

b) $P_{avg}$ is either a real or integer scalar that denotes the average power of the input signal x(k+1), see for instance the isotropic model of (10) which makes use of $P_{avg}$ in the generation of the second order statistics of the illustrative image example of FIG. 2 where $P_{avg}$ is assumed to be given by the integer value of 11,200; c) $\bar{J}$ is an integer APT m×n cross covariance matrix that is derived by rounding the product of the MMSE PT cross covariance matrix J by the average signal power $P_{avg}$, i.e., $$\bar{J}=\text{Round}(P_{avg}J). \tag{101}$$

and d) the MMSE PT cross covariance matrix J is approximated in FIG. 5 by the product of the integer matrix $\bar{J}$ and the scalar $1/P_{avg}$, i.e., $$J \approx \bar{J}/P_{avg}. \tag{102}$$

The validity of the approximation (102) is next demonstrated with our image example of FIG. 2. Making use of the MMSE PT cross covariance matrix J for the simple example (12) and the corresponding value for $P_{avg}$ of 11,200 in (101), it is first determined that integer matrix $\bar{J}$ is given by $$\bar{J} = \begin{bmatrix} -677 & -1252 & -1067 & -871 & -1285 & -1645 & -1591 & -1416 \\ 3495 & 1631 & 153 & -129 & 1037 & 856 & 206 & -138 \\ 1878 & 4362 & 2082 & 424 & 1251 & 2106 & 1590 & 712 \\ 416 & 2158 & 4545 & 2206 & 688 & 1743 & 2451 & 1840 \\ 175 & 807 & 3128 & 7775 & 728 & 1890 & 3959 & 6635 \\ 3514 & 1140 & 423 & 141 & 1670 & 987 & 457 & 159 \\ 2399 & 2354 & 1936 & 1653 & 7112 & 5262 & 4128 & 3409 \end{bmatrix} \tag{103}$$

Using expression (103) and also $P_{avg}=11,200$ in (102) it then follows that J is approximated by $$\bar{J}/P_{avg} = \begin{bmatrix} -.0604 & -.1118 & -.0953 & -.0778 & -.1147 & -.1469 & -.1421 & -.1264 \\ .3121 & .1456 & .0137 & -.0115 & .0926 & .0764 & .0184 & -.0123 \\ .1677 & .3895 & .1859 & .0379 & .1117 & .1880 & .1420 & .0636 \\ .0371 & .1927 & .4058 & .1970 & .0614 & .1556 & .2188 & .1643 \\ .0156 & .0721 & .2793 & .6942 & .0650 & .1688 & .3535 & .5924 \\ .3137 & .1018 & .0378 & .0126 & .1491 & .0881 & .0408 & .0142 \\ .2142 & .2102 & .1729 & .1476 & .6350 & .4698 & .3686 & .3044 \end{bmatrix} \tag{104}$$

A comparison of expressions (12) and (104) reveals that the approximation of J with $\tilde{J}/P_{avg}$ is indeed an excellent approximation for the considered example.

As summarized in FIG. 5 the computational burden associated with the APT forward prediction when evaluating the expression $$c'(k+1) = \tilde{P}\tilde{z}(k) \tag{105}$$

where $$\tilde{P} = \tilde{J}\tilde{R}/P_{avg}, \tag{106}$$

is as follows:
The integer product $$\tilde{J}\tilde{z}(k) \tag{107}$$

consists of nm integer multiplications and n(m−1) integer additions. (108)

The ratio $$[\tilde{J}\tilde{z}(k)]/P_{avg} \tag{109}$$

can be computed via n divisions (110)

either real or integer depending on the nature of $P_{avg}$.
The real product $$E^t H^t_{L-1} \ldots H_1^t H_0^t [\tilde{J}\tilde{z}(k)/P_{avg}] \tag{111}$$

is computed by executing $$n \sum_{i=0}^{L-1} w_i \text{ real multiplications} \tag{112}$$

and $$n \sum_{i=0}^{L-1} (w_i - 1) \text{ real additions.} \tag{113}$$

For completeness of presentation the APT forward predictor of expression (106) is evaluated next for the simple example of FIG. 2 and under the assumption that $w_f=2$ for all f. Using expressions (77) and (104) in (106) the following result is obtained:

$$\tilde{P} = \begin{bmatrix} .0079 & -.0199 & .0013 & .0147 & .0024 & .0050 & .0815 & -.3079 \\ .0452 & -.0893 & .1601 & -.0549 & .1086 & -.1158 & -.2284 & .1333 \\ -.0239 & .0972 & .1408 & -.0393 & -.0854 & -.1854 & -.2601 & .3836 \\ .0608 & .1003 & -.0796 & -.0849 & -.1188 & -.2139 & .0118 & .5075 \\ -.1050 & -.0975 & -.1867 & .1988 & .0812 & -.1541 & .3560 & .9067 \\ .0554 & -.0901 & .1127 & -.0786 & .1507 & -.0922 & -.2194 & .1812 \\ -.0437 & .0748 & -.1073 & -.1268 & .2097 & .1505 & -.4240 & .8442 \end{bmatrix} \tag{114}$$

A comparison of the MMSE PT forward predictor P of (13) and the APT forward predictor $\tilde{P}$ (114) reveals that these matrices differ somewhat. However, this should be of not concern since each predictor is matched to a different transformation, i.e., P is matched to the MMSE PT transformation matrix R and $\tilde{p}$ is matched to the APT transformation matrix $\tilde{R}$. To confirm this match it is noted, for instance, that the sum of the elements of any eigenvector or column of R is the same as the sum of the elements of the corresponding column for P; similar results can be confirmed for $\tilde{R}$ and $\tilde{p}$. In the 1986 IEEE NAECON paper it is noted that the aforementioned property of R and P results in innovation coefficients with a zero mean value. As a result, only when R and $\tilde{R}$ are very close to each other will the corresponding forward predictors also be very close in their values.

At this point it is noted that the computational burden associated with the APT forward predictor of FIG. 5 is very close to that of the APT transformations of FIGS. 3 and 4. One reason for this is that the number of real multiplications and real additions associated with the real product (111), and summarized by expressions (112) and (113), are the same as those for the APT forward and backward transformation apparatus of FIGS. 3 and 4. Another reason is that the number of integer multiplications and additions depicted in (108) for the integer product (107) is not as computationally taxing as the real multiplications and additions summarized by (112) and (113). The last reason is that the n divisions (110), either real or integer, required to evaluate the ratio (109) does not represent a significant computational burden when compared with the number of real multiplications and additions of (112) and (113), particularly for the case when the dimension of the input signal, n, is large and the dimension of the APT eigensystem, $w_f$, is small for all f.

In some cases it is possible to find analytical solutions for the reduced order APT eigensytem design equation (40). For instance, when $w_f=2$ the APT eigensystem design equation is of dimension 2×2 and it is generally described as follows:

$$\begin{bmatrix} k_{i,i} & k_{i,j} \\ k_{j,i} & k_{j,j} \end{bmatrix} \begin{bmatrix} r_{i,i} & r_{i,j} \\ r_{j,i} & r_{j,j} \end{bmatrix} = \begin{bmatrix} r_{i,i} & r_{i,j} \\ r_{j,i} & r_{j,j} \end{bmatrix} \begin{bmatrix} \lambda_i & 0 \\ 0 & \lambda_j \end{bmatrix}. \tag{115}$$

Under the assumption that the K matrix given in (115), i.e., $$K = \begin{bmatrix} k_{i,i} & k_{i,j} \\ k_{j,i} & k_{j,j} \end{bmatrix}, \tag{116}$$

is a positive define innovation covariance matrix, an analytical solution is forthcoming for the corresponding optimum transformation matrix R, i.e., $$R = \begin{bmatrix} r_{i,i} & r_{i,j} \\ r_{j,i} & r_{j,j} \end{bmatrix}, \qquad (117)$$

and its eigenvalue matrix $\Lambda$, i.e., $$\Lambda = \begin{bmatrix} \lambda_i & 0 \\ 0 & \lambda_j \end{bmatrix}. \qquad (118)$$

The analytical solution of the 2×2 eigensystem (115) is as follows:

For the case where $k_{j,j} > k_{i,i}$ it can be shown that $$r_{i,i} = \cos(\Phi), \qquad (119)$$

$$r_{i,j} = r_{j,i} = \sin(\Phi) \qquad (120)$$

$$r_{j,j} = -\cos(\Phi) \qquad (121)$$

where $$\Phi = 0.5 \arctan(2k_{i,j}/(k_{i,i} - k_{j,j})) \qquad (122)$$

and for the case where $k_{j,j} \leq k_{i,i}$ it can be shown that $$r_{i,i} = \sin(\Phi), \qquad (123)$$

$$r_{i,j} = r_{j,i} = -\cos(\Phi), \qquad (124)$$

$$r_{j,j} = -\sin(\Phi) \qquad (125)$$

where $\Phi$ is as defined in (122).

The eigenvalues of (118) are in turn given by the following analytical expressions:

$$\lambda_i = \frac{k_{i,i} + k_{j,j} - \sqrt{(k_{i,i} - k_{j,j})^2 + 4k_{i,j}k_{j,i}}}{2} \qquad (126)$$

and $$\lambda_j = \frac{k_{i,i} + k_{j,j} + \sqrt{(k_{i,i} - k_{j,j})^2 + 4k_{i,j}k_{j,i}}}{2}. \qquad (127)$$

The above analytical expressions (119)–(125) accelerate the solution of the 2×2 eigensystem (115). This acceleration will be highly desirable in adaptive applications where the signal and/or image model must be found on-line.

While the invention has been particularly shown and described with reference to preferred embodiments thereof, it will be understood by those skilled in the art that various changes in form and details may be made therein without departing from the spirit and scope of the invention.

What is claimed is:

1. A method of digital image modeling, a digital image divided into a plurality of digital image blocks, comprising the steps of:
   receiving a coder input vector of a plurality of digital image blocks;
   approximating a coefficient vector, each coefficient of the coefficient vector corresponding to one of the digital image blocks; wherein the step of approximating the coefficient vector comprises:
   generating a forward transformation matrix that yields a coefficient vector from a product of the coder input vector; and
   decomposing the forward transformation matrix into a product of at least one of a multi-diagonal transformation matrix and a sparse unitary transformation matrix and an energy sequencer unitary transformation matrix.

2. A method as in claim 1 wherein the coder input vector's dimension is a positive integer of power two.

3. A method as in claim 1 wherein the energy sequencer unitary transformation matrix arranges eigenvectors of the forward transformation matrix in ascending order.

4. A method as in claim 1 comprising the additional step of:
   multiplying an integer cross covariance matrix with the decomposed unitary transformation matrix.

5. A method as in claim 1, wherein the product of the integer cross variance matrix with the decomposed forward transformation matrix represents a predictive-transform predictive matrix.

6. A method as in claim 1, wherein the decomposed forward transformation matrix represents a predictive-transform unitary transformation matrix.

7. A method as in claim 1, wherein the sparse unity transformation matrix of the decomposing step comprise:
   a sparse unity structure having nonzero elements; and,
   an eigensystem for determining the nonzero elements of the sparse unitary structure.

8. A method as in claim 7, wherein the nonzero elements have been boosted by a factor of two.

9. A method of digital image modeling, a digital image divided into a plurality of digital image blocks, comprising the steps of:
   receiving a coefficient vector, each coefficient or coefficient vector corresponding to one of a plurality of digital image blocks;
   approximating a coder input vector of the digital image blocks; wherein the step of approximating the coder input vector comprises:
   generating a backward transformation matrix that yields a coder input vector from a product of the coefficient vector; and
   decomposing the backward transformation matrix into a product of at least one of a multi-diagonal transformation matrix and a sparse unitary transformation matrix and an energy sequencer unitary transformation matrix.

10. A method as in claim 9, wherein energy elements of the energy sequencer unitary transformation matrix are organized in an ascending order.

11. A method as in claim 9, wherein the decomposed backward transformation matrix represents a predictive-transform unitary transformation matrix.

12. A method of digital image modeling, a digital image divided into a plurality of digital image blocks, comprising the steps of:
   receiving a predictive vector representing a plurality of digital image blocks immediately adjacent a coder input vector comprising a plurality of digital image blocks of a divided digital image;
   approximating a coefficient vector, each coefficient of the coefficient vector corresponding to one of the digital image blocks of the divided digital image; wherein the step of approximating the coefficient vector comprises:

generating a forward prediction matrix that yields a coefficient vector from a product of the coder input vector; and decomposing the forward prediction matrix into a product of at least one of a multi-diagonal and a sparse unitary transformation matrix and an energy sequencer unitary transformation matrix and a cross variance matrix divided by the coder input vector's average power.

13. A method as in claim 12, wherein energy elements of the energy sequencer unitary transformation matrix are organized in an ascending order.

14. A method as in claim 12, wherein the decomposed forward prediction matrix represents a predictive-transform unitary transformation matrix.

* * * * *